US012008491B2

(12) United States Patent
Wiersma et al.

(10) Patent No.: US 12,008,491 B2
(45) Date of Patent: Jun. 11, 2024

(54) CHANGE MANAGEMENT LOGIC

(71) Applicant: Target Brands, Inc., Minneapolis, MN (US)

(72) Inventors: Luke Wiersma, Minneapolis, MN (US); Elizabeth Rolfzen, Minneapolis, MN (US); Joshua Koomen, Minneapolis, MN (US); Robin Basarich, Minneapolis, MN (US); Breanne Baker, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 252 days.

(21) Appl. No.: 17/670,417

(22) Filed: Feb. 11, 2022

(65) Prior Publication Data

US 2022/0253766 A1 Aug. 11, 2022

Related U.S. Application Data

(60) Provisional application No. 63/148,204, filed on Feb. 11, 2021.

(51) Int. Cl.
*G06Q 10/0631* (2023.01)
(52) U.S. Cl.
CPC .............................. *G06Q 10/06311* (2013.01)
(58) Field of Classification Search
None
See application file for complete search history.

(56) References Cited

U.S. PATENT DOCUMENTS

| 7,035,809 | B2 | 4/2006 | Miller et al. | |
|---|---|---|---|---|
| 7,162,427 | B1 | 1/2007 | Myrick et al. | |
| 7,792,694 | B2 * | 9/2010 | Jamil | G06Q 10/06 705/7.29 |
| 7,945,589 | B1 | 5/2011 | Weiss et al. | |
| 8,763,011 | B2 | 6/2014 | Novack et al. | |
| 10,074,114 | B2 | 9/2018 | Dueck | |
| 2001/0005399 | A1 | 6/2001 | Kimoto | |
| 2003/0110067 | A1 * | 6/2003 | Miller | G06Q 10/06 705/7.23 |
| 2004/0230471 | A1 | 11/2004 | Brookes | |
| 2006/0069607 | A1 | 3/2006 | Linder | |
| 2015/0067643 | A1 | 3/2015 | Behnia et al. | |
| 2018/0365604 | A1 | 12/2018 | Farooq et al. | |
| 2021/0320836 | A1 * | 10/2021 | Leibkowiz | H04L 41/0631 |

* cited by examiner

Primary Examiner — Folashade Anderson
(74) Attorney, Agent, or Firm — Barnes & Thornburg LLP

(57) ABSTRACT

A system and method for managing and scheduling changes across an organization. A change management computer system can receive a request to implement a proposed change for a facility of the organization, determine a change score for the proposed change that quantifies a magnitude of impact for the proposed change on the facility, access, from a database, data records identifying other changes currently scheduled to be performed by the facility over a plurality of time periods, determine scheduled change scores for the facility for the plurality of time periods based on other changes scores for other scheduled changes, identify time periods from the plurality of time periods as suitable for scheduling the proposed change based on the scheduled change scores and change score for the proposed change, and output identification of the time periods as suitable for scheduling the proposed change for the facility.

20 Claims, 24 Drawing Sheets

206

700

Initiative / Project

Your Functional Area
Select or enter value

Location
Select all that apply. If selecting a RDC building that is also a SFRDC building (i.e., 0558/9434), go ahead and select. The projects impacting ex. 0558 will still be organized within the building's dashboard.
Select or enter value

When will the initiative start?
When the TMs or Leaders will start doing the new process during production

When will the project end?
When the building solely owns the KPIs and there are no more touch bases needed outside of their normal business routines.

How long will the initiative take?
Use dates from above to set duration
○ 1-2 weeks
○ 3-4 weeks
○ 5-6 weeks
○ 7-9 weeks
○ 10-15 weeks
○ 16+ weeks

Notes:

Department(s) Impacted
Select or enter value

Level(s) Impacted
Select or enter value

Change Impact Scoring Table 800

| Size of Impact | Value | People {People Score} 802 | Process {Process Score} 804 | Technology {Technology Score} 806 | Data {Data Score} 808 | Deployment Duration {Duration Score} 810 |
|---|---|---|---|---|---|---|
| | | A description of what specifically, including commensurate and scope for overall, is being asked of the impacted employee | The actions or steps required to achieve a desired outcome | Automated applications capable in meeting a set of business objectives | Metrics, reporting and visualization required to communicate status and make decisions | Time to Design/Time to Ramp/Time to Execute |
| Small (individual: 1-3) | 1 | No people impact | Process changes to 1-3 in same function | Technology fixes to existing systems | New View (Card or chart) | 1-2 weeks |
| | 3 | Certain Non-Exempt Role in building | Process changes 1-3 across different functions | Technology enhancements to existing systems | New Datasets (RPS Down adjustments into Order canceled) | 3-4 weeks |
| Medium (Functional: 5-8) | 5 | Certain Non-Exempt Roles in a department | Process changes to 4-5 in same function | New technology capability deployment to current system | New Metric building (accountable to loadback to RPS) | 5-6 weeks |
| | 8 | Progress roles in a department | Process changes to 4-5 across different functions | New technology assets and capability deployment | New Metric added to Data Bridge consumption | 7-8 weeks |
| Large (...) | 10 | ... | Changes to three applications | ... | ... | 9+ weeks |
| X-Large (...) | ... | | | | | |

Change Impact score 812 = People Score 802 * (Process Score 804 + Technology Score 806 + Data Score 808 + Duration Score 810)

CHANGE MANAGEMENT LOGIC

TECHNICAL FIELD

This document generally describes devices, systems, and methods related to determining an impact of operational changes in an enterprise.

BACKGROUND

Enterprise organizations can include many different physical locations that contain the same or similar departments within each location. For example, an enterprise organization may have multiple different retail stores and distribution centers that each include departments that are staffed by workers to cover one or more portions of the retail store's and the distribution center's operation, such as point of sale operations, stocking inventory on the sales floor, returns and exchanges, back of store operations, and/or others. Departments in retail stores and distribution centers may be staffed by one or more teams of workers, which can each include one or more team leaders and a group of workers who are tasked with performing the operations of one or more departments.

To ensure that departments and teams in an enterprise environment provide consistent service across the enterprise, and are able to incorporate new processes/technology into their duties, training sessions can be scheduled and rolled out across teams and departments across the enterprise. Such trainings can include, for example, training sessions to introduce workers to new handheld product scanners and processes for using the devices that have been developed for the enterprise organization. Training can occur across a variety of different topics, including safety, processes, equipment, and/or others. Training for the same departments and teams across different locations within an enterprise organization may not be performed at the same time, but may be iteratively rolled out across the different locations within period of time (e.g., within 2 month window).

SUMMARY

The disclosed technology is generally directed to a platform, system, and methods to better assess, plan for, and implement organizational changes in an enterprise or organization. The disclosed technology can permit for improved planning and coordination to implement operational changes. For example, organizations may implement changes across various buildings at different times. Organizations may also implement changes across various departments or other groupings of workers within the organizations. However, it can be challenging to understand and project the impact of changes to buildings and/or departments, including how to implement multiple different changes across building and/or departments without overloading them. The disclosed technology can provide for determining an impact of implementing operational changes across buildings and/or departments in the organization, which can ensure that the changes are adopted and without overwhelming and/or overloading buildings and/or departments.

The disclosed technology can provide mechanisms for measuring an impact that change has on a team, department, or building. For example, roadmap milestones can be identified to define elements of a change. These milestones can be collected by software tools or other applications from headquarters, site locations, etc. The disclosed technology can measure the impacts of the change(s) across different metrics, such as people, processes, technology deployments, data, and durations, based on the roadmap milestones. Readiness metrics can also be generated and displayed to show present disruptions and readiness metrics pertaining to a particular change. These metrics can also be aggregated to show metrics for a particular location, time, team, etc.

To measure change impacts, a scaling metric can be used that includes multiple components. The first component can be a "People" component that increases as a number of people are impacted by a change. The second component can be a "Process" component that increases as a number of processes are impacted by the change. The third component can be a "Technology" component that increases as a complexity and scale of the impact to a technology deployment increases. The fourth component can be a "Data" component that increases as a complexity or volume of data impacted by the change increases. The fifth component can be a "Deployment Duration" component that increases as a length of time needed to deploy the change increases. This scaling metric can then be calculated for a particular change, and stored in a data store. The data store can also store information associated with the metric, such as records of people or groups of people impacted, locations impacted, etc.

The scaling metric can be displayed in a graphical user interface (GUI). For example, a GUI can show a timeline with changes for a given person, group, location, etc. This can allow a user to quickly see when a particular change is scheduled for. This can also show the user when interactions of changes may be particularly beneficial or detrimental. As an example, a particular location can be scheduled to have a number of difficult changes at a same time, but each change can apply to different teams in the location. The user may use this information to, e.g., reschedule some of the changes to ensure the location does not have too many changes at once. The user may also decide that, since the changes apply to different teams, the changes can proceed at the same time. Later, the user may see that a particular data system may be scheduled to have many medium-intensity changes scheduled, so the user can allocate additional support to a team in charge of managing that data. Another example GUI can include roadmaps showing a calendar or timeline of changes. Yet another example GUI can include bar-chart(s) that shows a stack of changes. The changes can be distinguished using size and color based on a number, intensity, and type of change scheduled. Another example GUI can include a spreadsheet with cells that contain change values with color-coding to call out high-change times. One or more other GUIs can be realized based on the disclosed technology.

Particular embodiments described herein include a system and method for managing and scheduling changes across an organization. The embodiments can include receiving, at a change management computer system, a request to implement a proposed change for a facility within an organization, wherein the request includes parameters for the proposed change, determining, by the change management computer system, a change score for the proposed change that quantifies a magnitude of impact for the proposed change on the facility within the organization, accessing, from a change management database system, data records identifying other changes that are currently scheduled to be performed by the facility over a plurality of time periods, wherein the data records include other change scores for the other changes that quantify magnitudes of impact for the other changes on the facility; determining, by the change management computer system, a plurality of scheduled change scores for the facility within the organization for the plurality of time periods based, at least in part, on the other changes scores for the other changes scheduled for the facility over the plurality of time periods, wherein the plurality of schedule change scores indicate an aggregate magnitude of impact on the facility for the other changes already scheduled for the facility in the plurality of time periods; identifying, by the change management computer system, one or more time periods from the plurality of time periods as being suitable for scheduling the proposed change for the facility based, at least in part, on (i) the plurality of scheduled change scores and (ii) the change score for the proposed change; and outputting, by the change management system, identification of the one or more time periods as being suitable for scheduling the proposed change for the facility.

In some implementations, the particular embodiments can optionally include one or more of the following features. For example, determining the change score for the proposed changes can include determining, by the change management computer system, a people metric based on the parameters, wherein the people metric quantifies a personnel impact on the facility for the proposed change, determining, by the change management computer system, a process metric based on the parameters, wherein the process metric quantifies a process impact on the facility for the proposed change, determining, by the change management computer system, a technology metric based on the parameters, wherein the technology metric quantifies a technology impact on the facility for the proposed change, determining, by the change management computer system, a data metric based on the parameters, wherein the data metric quantifies a data impact on the facility for the proposed change, determining, by the change management computer system, a duration metric based on the parameters, wherein the duration metrics quantifies a deployment duration impact on the facility for the proposed change, and determining, by the change management computer system, the change score based on a combination of the people metric, the process metric, the technology metric, the data metric, and the duration metric.

As another example, the combination of the people metric, the process metric, the technology metric, the data metric, and the duration metric can include generating a sum of the process metric, the technology metric, the data metric, and the duration metric, and generating a product of the sum multiplied by the people metric, wherein the combination can include the product. The people metric, the process metric, the technology metric, the data metric, and the duration metric can also be selected from a set of enumerated values based on the parameters.

Determining the change score for the proposed changes can also include determining, by the change management computer system, a people metric weight based on (i) roles of people in the facility impacted by the proposed change and (ii) historical performance of the people in the facility with regard to previous changes, and weighting the people metric using the people metric weight. Determining the change score can also include determining, by the change management computer system, a process metric weight based on a number of precursor actions required by the facility to implement the proposed change, and weighting the process metric using the process metric weight. In some examples, determining the change score can include determining, by the change management computer system, a technology metric weight based on (i) a number of technology changes required for the proposed change and (ii) a magnitude of the technology changes, and weighting the technology metric using the technology metric weight. Determining the change score can also include determining, by the change management computer system, a data metric weight based on (i) changes to types of information presented to users and (ii) changes to interfaces presented to the users by the proposed change, and weighting the data metric using the data metric weight. In some examples, determining the change score can also include determining, by the change management computer system, a duration metric weight based on a length of time required to implement the proposed change, and weighting the duration metric using the duration metric weight.

As another example, identifying the one or more time periods can include determining aggregate change scores for the plurality of time periods, wherein each of the aggregate change scores can be determined based on an aggregation of a portion of the plurality of scheduled change scores that fall within the corresponding time period, and identifying the one or more time periods based on a comparison of the aggregate change scores for the plurality of time periods. The comparison of the aggregate change scores can also include comparing the aggregate change scores against a plurality of score ranges indicating a capacity of the facility to accept further changes within a time period.

In some examples, the plurality of score ranges can include a first score range that indicates that the facility does not have capacity to accept further changes within the time period, a second score range that indicates that the facility is nearing capacity to accept further changes within the time period, and a third score range that indicate that the facility has at least a threshold amount of capacity to accept further changes within the time period. The one or more time periods can be identified based on their corresponding aggregate change scores being within the third score range. Outputting the identification of the one or more time periods can also include outputting the one or more time periods with designations for being within the third score range. Outputting can further include outputting the other time periods from the plurality of time periods with their corresponding designations for the first score range and the second score range. The score ranges can also be dynamically determined for the facility based on their historical performance with regard to changes.

The comparison can also be performed by comparing each of the aggregate change scores plus the change score against a plurality of score ranges indicating a capacity of the facility to accept further changes within a time period. The plurality of score ranges can include a first score range that indicates that the facility does not have capacity to accept further changes within the time period, a second score range that indicates that the facility is nearing capacity to accept further changes within the time period, and a third score range that indicate that the facility has at least a threshold amount of capacity to accept further changes within the time period. Moreover, the one or more time periods can be identified based on their corresponding aggregate change scores plus the change score being within the third score range.

The devices, system, and techniques described herein may provide one or more of the following advantages. For example, the disclosed technology can provide mechanisms for quantifying different metrics to determine change impacts. Without the disclosed technology, it can be challenging to assess the impact of changes across teams and departments. By providing an accurate quantification of the impact of a change on a team, the disclosed technology can create a better way to monitor for, schedule, and roll out changes across groups in an organization to ensure that teams are not overloaded with change at any point in time. The resulting benefits of using this technology is that by scheduling changes with teams at appropriate times (i.e., when they are not overloaded with other changes), they are able to better retain and implement the changes, they are less likely to need retraining, and they are likely to perform their duties better. Example metrics to quantify change can include, for example, people metrics, process metrics, technology metrics, data metrics, and deployment duration metrics, which can be combined to determine an overall change impact metric. Using these metrics, the disclosed technology can provide for a more holistic quantification of change and how it can impact a team, a department, a facility, and/or an enterprise. This change quantification can be used to efficiently and effectively implement changes and maintain sustainable practices in the enterprise.

As another example, the disclosed technology can provide for improved planning and coordination of changes across different levels (e.g., team, department, facility, enterprise, etc.). GUIS can display various different views of roadmaps, change metrics, and other information relevant for planning and implementing change. Such views can provide for aligning teams around a shared vision, identifying and reinforcing behaviors needed for successful change implementation, identifying disruptions that drive activation and minimize risk, preparing leaders and team members for change, and achieving change adoption and sustainability. Therefore, the disclosed technology can provide for proactive visibility of change milestones. For example, leaders and teams can have early visibility to risks such that they can more proactivity mitigate the risks, support change operations, and improve overall leader and team member experiences.

As yet another example, the disclosed technology can provide for scalability of change operations in an enterprise. Change impacts can be quantified and viewed from bottom up and top down approaches. Change impacts can be specific to teams and/or departments. These change impacts can be aggregated to determine overall change impacts across many departments, facilities, regions, and the enterprise or organization. Aggregating metrics and overlapping changes in different GUIs can provide a more granular understanding of how particular elements of the enterprise (e.g., teams, facilities, regions) can be subject to multiple simultaneous changes. As a result, change can be more effectively and efficiently deployed throughout the enterprise to improve change implementation and sustainability.

As another example, the disclosed technology can improve change scheduling across different levels of the enterprise. Readiness and health metrics of teams, facilities, and/or regions can be taken into account to determine whether teams are ready and able to implement change. As a result, change implementation can be effective and sustainable. Moreover, this change scheduling can help team members handle and take on changes. For example, scheduling change based on a team's readiness for taking on that change can help prevent the team members from being overwhelmed, overworked, disappointed with their job/role, and/or worn down by their job/role. Taking into account such metrics can improve the team's ability to accept, adopt, and/or implement change, which can improve overall change sustainability in the enterprise.

The details of one or more implementations are set forth in the accompanying drawings and the description below.

Other features and advantages will be apparent from the description and drawings, and from the claims.

BRIEF DESCRIPTION OF THE DRAWINGS

FIGS. 7B-C depict example graphical user interfaces (GUIs) for change impact assessment.

FIG. 8 depicts a table for determining the change impact score.

FIG. 12 is an example change impact roadmap for a facility in the enterprise.

Like reference symbols in the various drawings indicate like elements.

DETAILED DESCRIPTION OF ILLUSTRATIVE EMBODIMENTS

The disclosed technology is generally directed to a platform, system, and methods to assess, plan for, and implement organizational changes in an enterprise. The disclosed technology can provide for aggregated and proactive views of change across a network, such as an enterprise or organization. Such views can provide for defining and aligning accountabilities across changes that enable leaders and/or team members to maintain consistent execution and experience throughout a change process.

Figure 1:
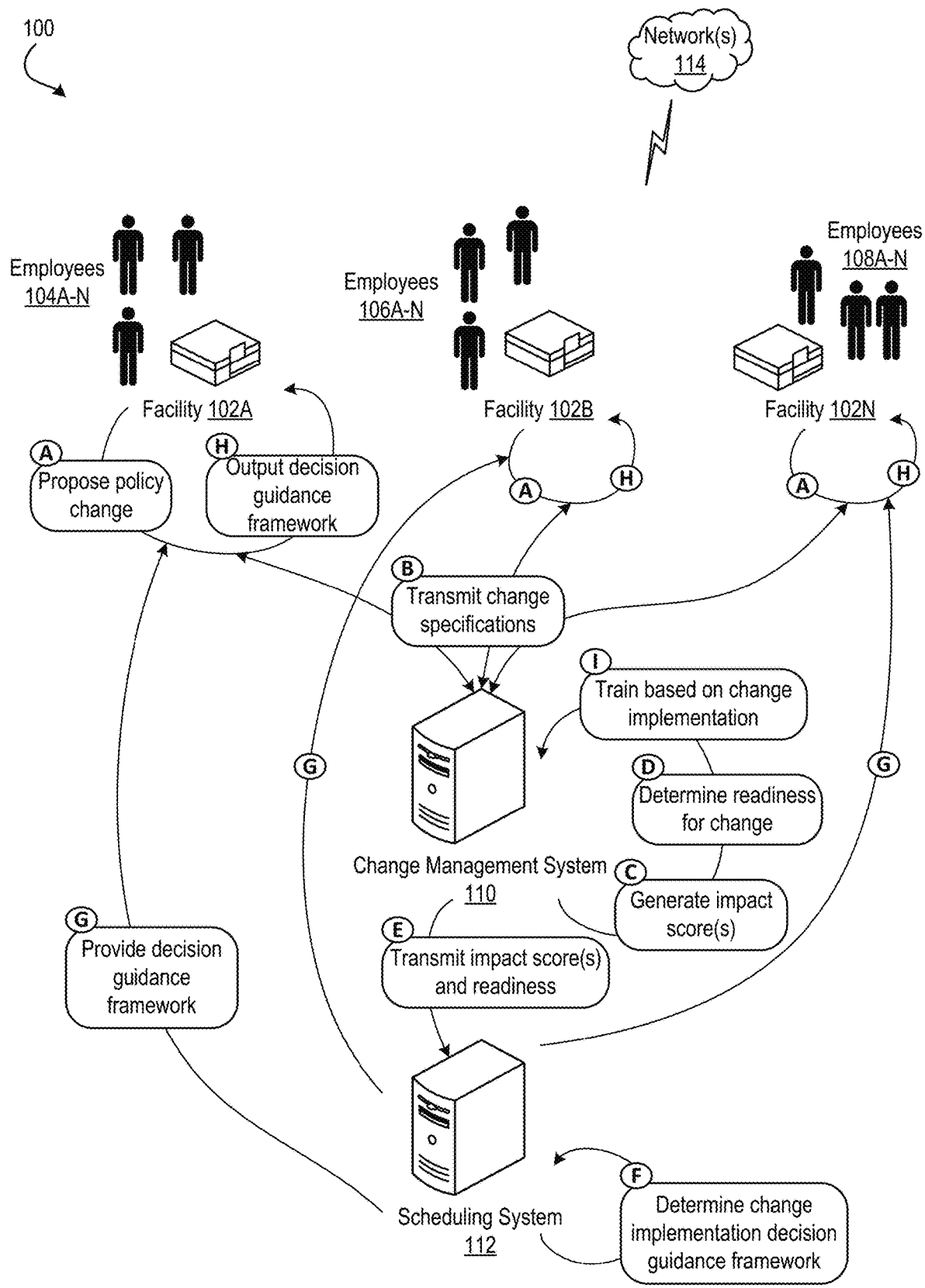
FIG. 1 is a conceptual diagram of a system for managing and implementing change.

Referring to the figures, FIG. 1 is a conceptual diagram of a system 100 for managing and implementing change. The system 100 can be an enterprise or organization having facilities 102A-N. The facilities 102A-N can include distribution centers, stores, and/or offices. Each of the facilities can have employees. For example, facility 102A can have employees 104A-N, facility 102B can have employees 106A-N, and facility 102N can have employees 108A-N. The employees 104A-N, 106A-N, and 108A-N can be workers, team members, leaders, and/or team leaders. Moreover, the employees can be broken up into different teams at each of the facilities.

One or more of the employees 104A-N, 106A-N, and 108A-N (e.g., team leaders) can send and receive information, using computing devices (e.g., mobile device, smart phone, tablet, computer, mobile application, web application), from a change management system 110 over network(s) 114 (e.g., wired and/or wireless communication). The change management system 110 and the employees 104A-N, 106A-N, and 108A-N can also communicate with a scheduling system 112.

As depicted, at one or more of the facilities 102A-N, a policy change can be proposed (A). This proposal can be made by an employee, such as a team leader, in a change impact assessment application (e.g., refer to FIGS. 7A-C) that is displayed to the employee at a computing device. One or more change proposals can be made at a facility. Change proposals can include an of a variety of changes to a facility that may affect worker performance of their duties such as, for example, training workers on new processes, systems, devices, and/or equipment, human resources ("HR") initiatives (e.g., diversity and inclusion training), capital improvements ("CapEx") (e.g., physical changes to facility, such as construction, repairs, and improvements), and/or other change proposals. Change impact specifications for the change proposal can be transmitted to the change management system 110 (B). The system 110 can then generate a change impact score based on the change impact specifications (C). A change impact score can be generated for each proposed policy change. The change impact score can be generated for a team that can be effected by the proposed policy change. In some implementations, the system 110 can additionally or alternatively generate an aggregate change impact score for a facility that can be effected by the proposed policy change.

The system 110 can also determine team readiness for the proposed change (D). Team readiness can take into account one or more factors, such as environmental conditions, the team's prior experiences with implementing change, and how healthy the team is to implement change. The system 110 can transmit the impact score and readiness metric(s) to the scheduling system 112 (E). The scheduling system 112 can determine a change implementation decision guidance framework (F). In some implementations, determining the decision guidance framework can be performed dynamically and/or automatically by the system 112. In other implementations, an employee of the system 100 can determine and/or adjust the change implementation decision guidance framework.

Decision guidance framework can be provided to the facilities that proposed policy changes (G). The decision guidance framework can include new or modified change implementation decision guidance. The decision guidance framework can also include graphical displays (e.g., bar charts, roadmaps) of change metrics, readiness, and/or change impact scores that can be used by employees at the facility to determine how to implement the proposed change. The decision guidance framework can include scheduling guidance, sequencing guidance, prioritization guidance, etc.

The decision guidance framework can be outputted to computing devices of employees at the facility (H). As described throughout this disclosure, graphical user interfaces (GUIs) can provide different displays of change metrics, roadmaps, and/or change decision guidance frameworks. The displays can follow a bottom up and/or top down approach, in which the metrics, roadmaps, and/or change schedules or decision guidance can be specific to a particular team, department, facility, region, etc.

In some implementations, one or more employees at the facilities (e.g., team leaders) can modify a change implementation decision guidance framework (e.g., schedule) based on the decision guidance framework (G) and/or implement the change at the facility (H). Information about performance of the change implementation can be provided to the change management system 110.

The change management system 110 can train based on the change implementation (I), thereby creating a closed feedback loop. For example, the system 110 can dynamically adjust one or more change impact scores specific to a team that implemented the change and/or a facility where the change was implemented. As another example, the system 110 can adjust a team's readiness (e.g., overload threshold) for subsequent change based on how well the team performed in implementing the change. Moreover, adjusted change impact scores and/or readiness metrics can be transmitted to the scheduling system 112. The system 112 can then dynamically adjust change implementation schedules. The training (I) can be advantageous to improve change management determinations and/or scheduling relative to real-time conditions in the facilities 102A-N.

As depicted in FIG. 1, the change management system 110 and the scheduling system 112 can be separate computer systems. In other implementations, the systems 110 and 112 can be one computer system or any other combination thereof.

Figure 2:
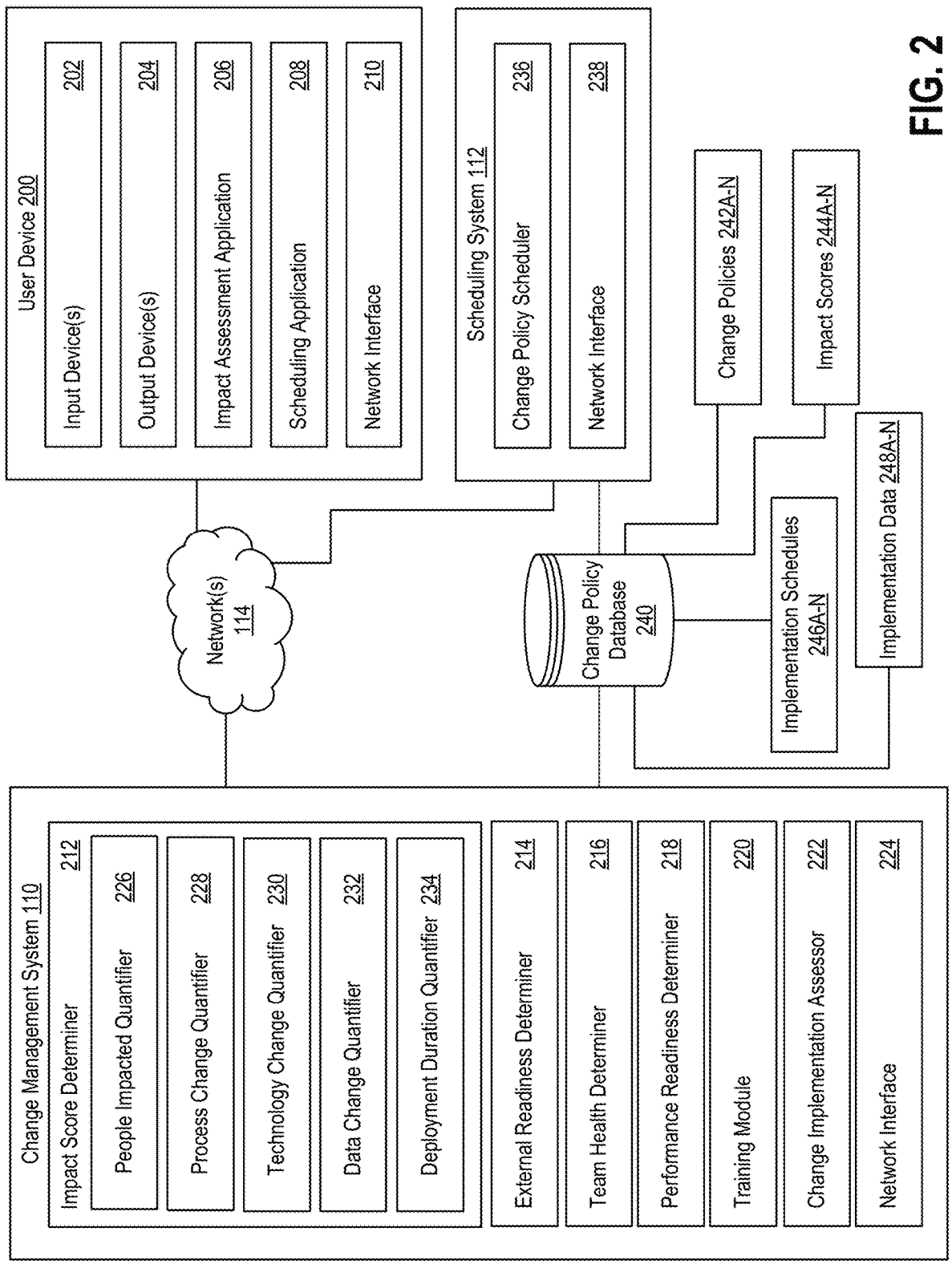
FIG. 2 is a block diagram of components of the system of FIG. 1.

FIG. 2 is a block diagram of components of the system of FIG. 1. As depicted and described in reference to FIG. 1, the change management system 110 and the scheduling system 112 can be in communication via the network(s) 114. A user device 200 can also communicate with the systems 110 and/or 112 over the network(s) 114. The user device 200 can be a computing device of one or more employees (e.g., team leaders) in a facility (e.g., refer to FIG. 1). Moreover, multiple user devices 200 can be in communication with the systems 110 and/or 112, where each user device 200 corresponds to a different employee in a same or different facility.

The user device 200 can include input device(s) 202, output device(s) 204, an impact assessment application 206, a scheduling application 208, and a network interface 210. As described above, the user device 200 can be a computing device, such as a mobile device, computer, laptop, smartphone, and/or tablet. The input device(s) 202 can be a touchscreen display, keyboard, mouse, microphone, or any other type of device that an employee can use to input information. The output device(s) 204 can be a touchscreen display, a different type of display, or any other type of device that can present information to the employee.

The impact assessment application 206 can be presented to the employee on a display (e.g., the output device(s) 204). The application 206 can allow for the employee to input a proposal for change. The application 206 can be a mobile application and/or a web application. The application 206 can provide the employee with data fields that can be completed by the employee (e.g., the employee can provide input via the input device(s) 202). The data fields can identify information relevant to the proposed change, such as people impacted, process changes, a deployment duration, etc. (e.g., refer to FIGS. 7A-C).

The scheduling application 208 can be presented to the employee on the display. The application 208 can provide GUI displays of change impacts, readiness for change, a change impact roadmap, change implementation schedules, and/or change across different levels of the enterprise (e.g., refer to FIGS. 9-11). The employee or other employees can use the application 208 to implement the proposed change, plan for change, and/or manage change. The employee can also adjust or modify change implementation schedules via the scheduling application 208.

The network interface 210 can be configured to provide communication with one or more components or systems described herein.

The change management system 110 can include an impact score determiner 212, an external readiness determiner 214, a team health determiner 216, a performance readiness determiner 218, a training module 220, a change implementation assessor 222, and a network interface 224. The system 110 can have fewer or additional components. Further, one or more of the components of the system 110 can be combined in any combination(s).

The impact score determiner 212 can include a people impacted quantifier 226, a process change quantifier 228, a technology change quantifier 230, a data change quantifier 232, and a deployment duration quantifier 234. The impact score determiner 212 can be configured to determine an overall change impact score. The change impact score can be specific to change that is proposed by the employee at the impact assessment application 206 on the user device 200. The change impact score can be specific to a team or group of people indicated by the employee's input at the impact assessment application 206. In other implementations, the impact score determiner 212 can generate an aggregate change impact score for a department, facility, region, and/or overall enterprise.

Each of the quantifiers 226, 228, 230, 232, and 234 can generate numeric values for one or more metrics that are provided by the employee in the impact assessment application 206. These numeric values can then be scaled relative to each other by the impact score determiner 212 to determine the overall change impact score (e.g., refer to FIGS. 4, 8).

The people impacted quantifier 226 can determine a measure of how many people are impacted by the proposed change. This measure can be indicative of how much of an impact the proposed change will have on a number of people. As an example, the more people impacted by the proposed change, the more likely the people impacted value will be higher.

The process change quantifier 228 can determine a measure of how many processes are impacted by the proposed change. This measure can be indicative of whether the proposed change impacts many processes and/or whether many changes would be made to existing processes. As an example, the more processes that are impacted by the proposed change, the more likely the process change value will be higher.

The technology change quantifier 230 can determine a measure of how much existing technology may be changed by the proposed change and/or how much new technology is needed for that change. As an example, the more that existing technology has to change and/or new technology needs to be introduced, the more likely the technology change value will be higher.

The data change quantifier 232 can determine a measure of how much metrics, reporting, and/or visualization of information may be changed by the proposed change. As an example, the more that new GUIs or metrics are implemented, the more likely the data change value will be higher.

The deployment duration quantifier 234 can determine a measure of how much time is needed to implement the proposed change from start to finish. As an example, the longer it takes to implement the proposed the change, the more likely the duration value will be higher.

Still referring to the change management system 110 in FIG. 2, the external readiness determiner 214 can be configured to determine how much external factors can impact implementation of the proposed change. The determiner 214 can receive information about external factors from the user device 200 (e.g., via the impact assessment application 206). The determiner 214 can also receive information about external factors from one or more other computer systems, servers, and/or databases. Example external factors can include events such as a pandemic, natural disaster, seasonal changes, holidays, economic fluctuation, etc. The determiner 214 can generate a score or value associated with external readiness. This score can be used by the impact score determiner 212 as a weight to modify and/or adjust the change impact score. For example, a natural disaster can put a lot of stress on a facility. Therefore, the determiner 214 can assign a high external readiness value. This value can be weighted with the people impacted, process change, technology change, data change, and duration values in generating the change impact score by the determiner 212. In this example, the external readiness value can cause the change impact score to increase, which can indicate that the proposed change should not be implemented immediately (e.g., it would not be sustainable).

Likewise, the team health determiner 216 can be configured to determine how exhausted a team is, which can impact implementation of the proposed change. The determiner 216 can receive information about team health from the user device 200 (e.g., via the impact assessment application 206). The determiner 216 can also receive information about team health from one or more other computer systems, servers, and/or databases. Team health can be measured over a predetermined period of time (e.g., 8 weeks). Team health can indicate whether a team is worn down, overworked, under high stress, experiencing a lot of change, receptive to change, ready to take on change, willing to take on change, having bandwidth to take on change, etc. The determiner 216 can generate a score or value associated with team health. This score can be used by the impact score determiner 212 as a weight to modify and/or adjust the change impact score. For example, a holiday season can overwork the team. Therefore, the determiner 216 can assign a team health value that corresponds to the team being overworked or exhausted. This value can be weighted with the people impacted, process change, technology change, data change, duration values, and even external readiness value in generating the change impact score by the determiner 212. In this example, the team health value can cause the change impact score to increase, which can indicate that the proposed change should not be implemented immediately (e.g., it would not be sustainable).

Similarly, the performance readiness determiner 218 can be configured to determine how the team has handled change in the past, which can impact implementation of the proposed change. The determiner 218 can receive information about historic team performance from the user device 200 (e.g., via the impact assessment application 206). The determiner 218 can also receive information about team performance from one or more other computer systems, servers, and/or databases. Performance readiness can be measured over a predetermined period of time (e.g., 8 weeks). Performance readiness can indicate whether a team handled change well in the past, handled change poorly in the past, was adaptable to change, rejected change, experienced problems or issues in implementing change, positively implemented change, etc. The determiner 218 can generate a score or value associated with performance readiness. This score can be used by the impact score determiner 212 as a weight to modify and/or adjust the change impact score. For example, a team may dislike any change. Therefore, the determiner 218 can assign a performance readiness value that corresponds to the team being against change. This value can be weighted with the people impacted, process change, technology change, data change, duration values, and even external readiness value and/or team health value in generating the change impact score by the determiner 212. In this example, the performance readiness value can cause the change impact score to increase, which can indicate that the proposed change should not be implemented immediately (e.g., it would not be sustainable).

The training module 220 can be configured to modify or adjust one or more algorithms, models, engines, and/or determiners of the system 110. As a result, the system 110 can determine more accurate change impact scores and/or readiness metrics.

The change implementation assessor 222 can be configured to receive information from the user device 200 with regards to change that is being implemented. Using this information, the assessor 222 can determine efficacy and/or sustainability of the implemented change. Such determinations can be provided to the training module 220 for improving one or more components, as described above. Such determinations can also be provided to the impact score determiner 212 and/or the determiners 214, 216, and/or 218 to adjust or modify change impact scores and/or readiness metrics. Therefore, any one or more of the determiners 212, 214, 216, and/or 218 can dynamically adjust change impact scores and/or readiness metrics based on actual and/or real-time change implementation.

The network interface 224 can be configured to provide communication with one or more components or systems described herein.

Still referring to FIG. 2, the scheduling system 112 can include a change policy scheduler 236 and a network interface 238. The change policy scheduler 236 can receive information from the change management system 110, such as change impact scores and/or readiness metrics. The scheduler 236 can also receive additional information about the team, facility, region, and/or enterprise from other computers, systems, servers, and/or databases. Using the change impact scores, readiness metrics, and/or additional information, the scheduler 236 can generate or propose schedules and roadmaps for implementing the proposed change. Such scheduling guidance can be provided to the user device 200 and displayed in the scheduling application 208. As mentioned above, the employee can then adopt the scheduling guidance and/or make their own adjustments to change implementation schedules and/or roadmaps.

The network interface 238 can be configured to provide communication with one or more components or systems described herein.

The change management system 110 and the scheduling system 112 can be in communication with a change policy database 240. The database 240 can be a data store, cloud, remote server, a group of servers, etc. The database 240 can store information such as change policies 242A-N, change impact scores 244A-N, change implementation schedules 246A-N, and/or implementation data 248A-N.

The change policies 242A-N can include proposed changes made by the employee in the impact assessment application 206. The change policies 242A-N can also include information about changes that are actually implemented in a team, department, facility, region, and/or overall enterprise.

The impact scores 244A-N can include change impact scores that are determined by the impact score determiner 212 of the change management system 110. The scores 244A-N can also include values that comprise the overall score, such as the people impacted, process change, technology change, data change, deployment duration, and/or readiness metrics described herein.

The implementation schedules 246A-N can include generated and/or proposed scheduling guidelines made by the change policy scheduler 236 of the scheduling system 112. The implementation schedules 246A-N can also include one or more modified schedules made by the employee at the scheduling application 208 of the user device.

The implementation data 248A-N can include information received from the user device 200 during and/or after implementation of change. For example, information about actual performance of the change can be stored as implementation data 248A-N. The implementation data 248A-N can be used by the change implementation assessor 222 of the change management system 110 to determine a sustainability and/or efficacy of the change implementation. Moreover, the implementation data 248A-N can be used by one or more of the determiners 212, 214, 216, and 218 of the change management system 110 to adjust change impact scores and/or readiness metrics. In yet other examples, the implementation data 248A-N can be used by the change policy scheduler 236 of the scheduling system 112 to generate new or updated scheduling guidance.

Figure 3:
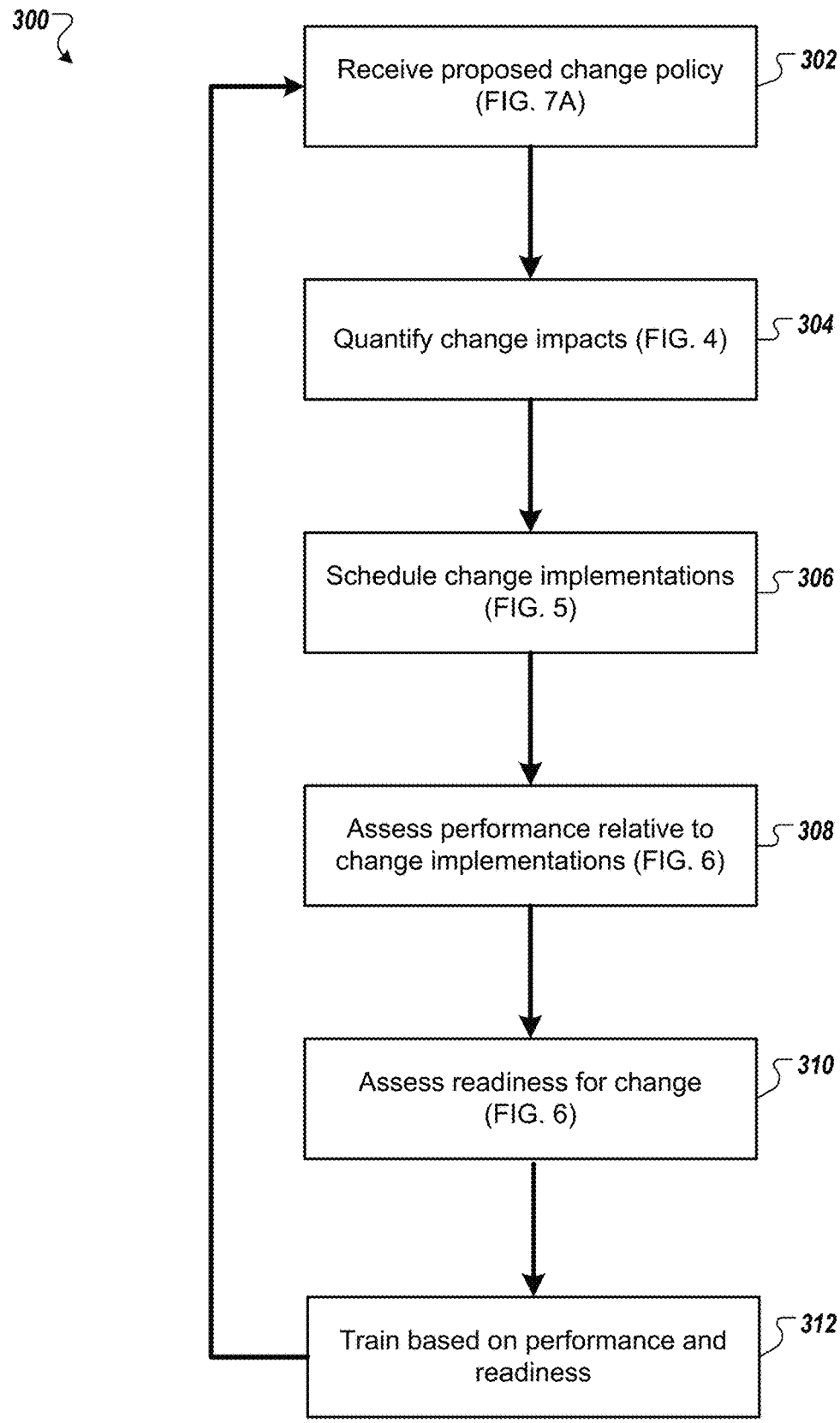
FIG. 3 is a flowchart of a process for managing and implementing change.

FIG. 3 is a flowchart of a process 300 for managing and implementing change. The process 300 can be performed by one or more computer systems described herein, such as the change management system 110 and/or the scheduling system 112. One or more other computer systems can be used to perform the process 300.

Figure 7A:
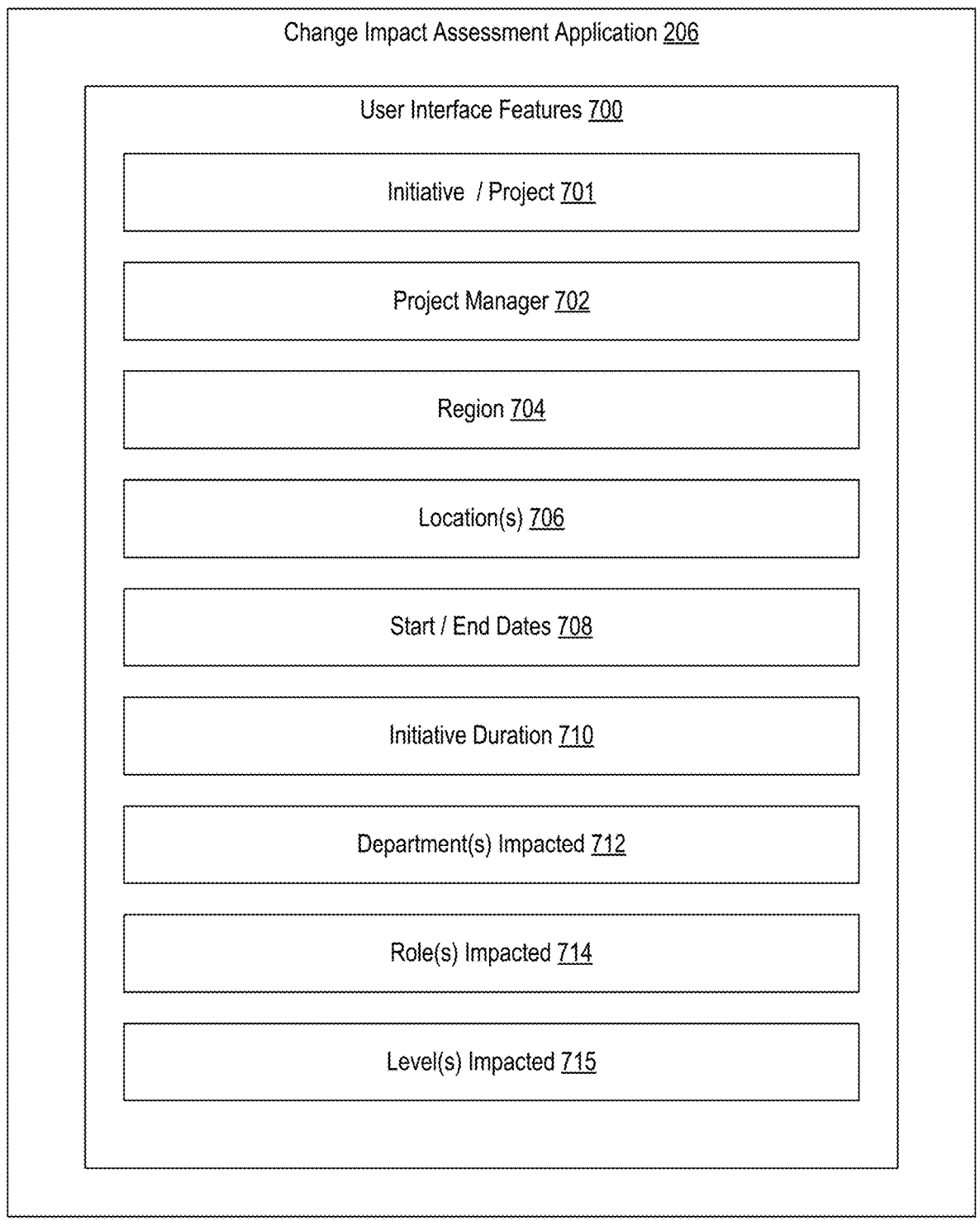
FIG. 7A depicts example data fields for change impact assessment.
Figure 7C:
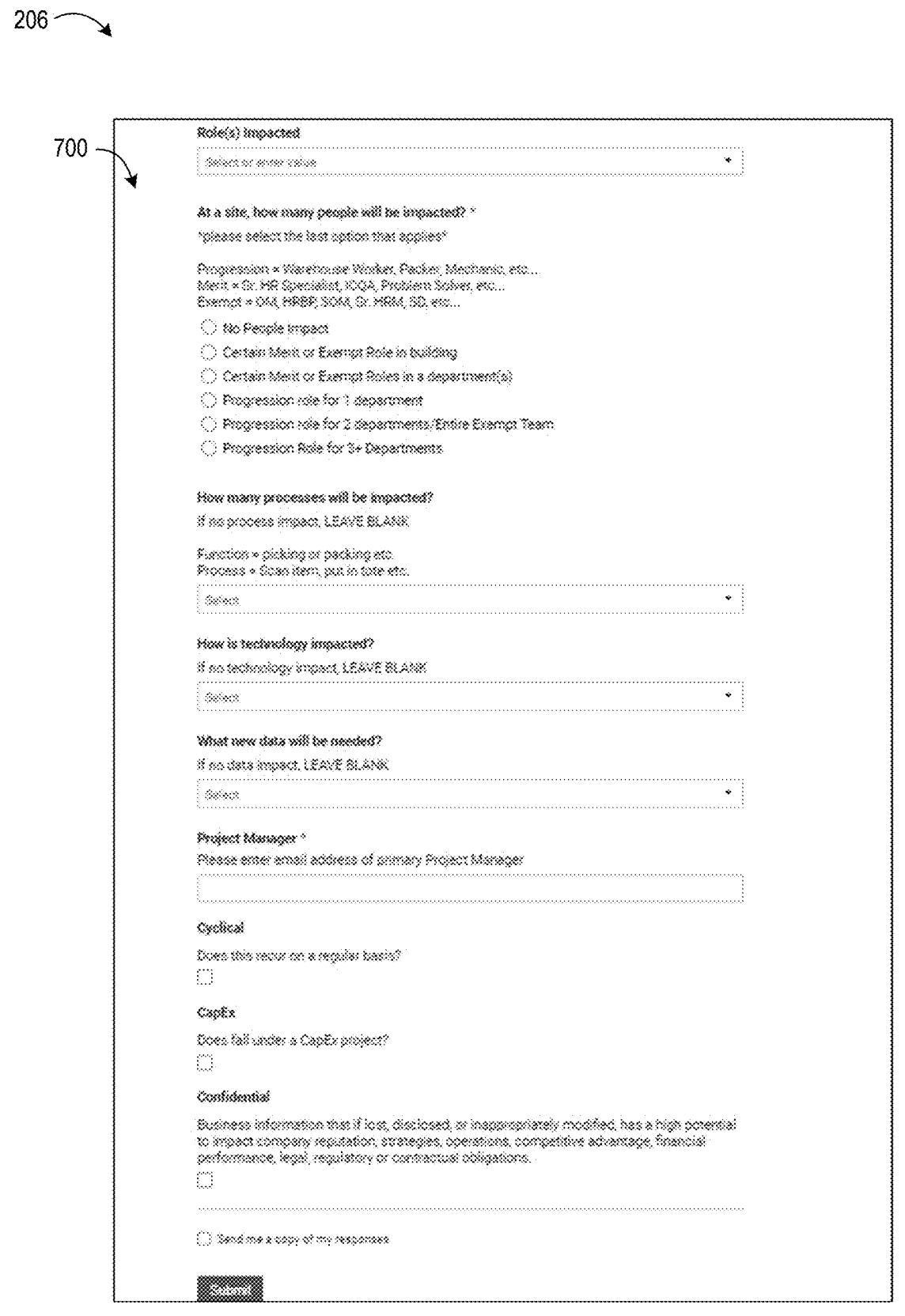

A proposed change policy can be received in 302 (e.g., refer to FIGS. 7A-C). As described herein, the change policy can be proposed and inputted at a user device by an employee. The proposed change policy can include metrics and/or information about the change, such as people, process, technology, and data that may be impacted. The change management system can receive the proposed change policy.

Figure 4:
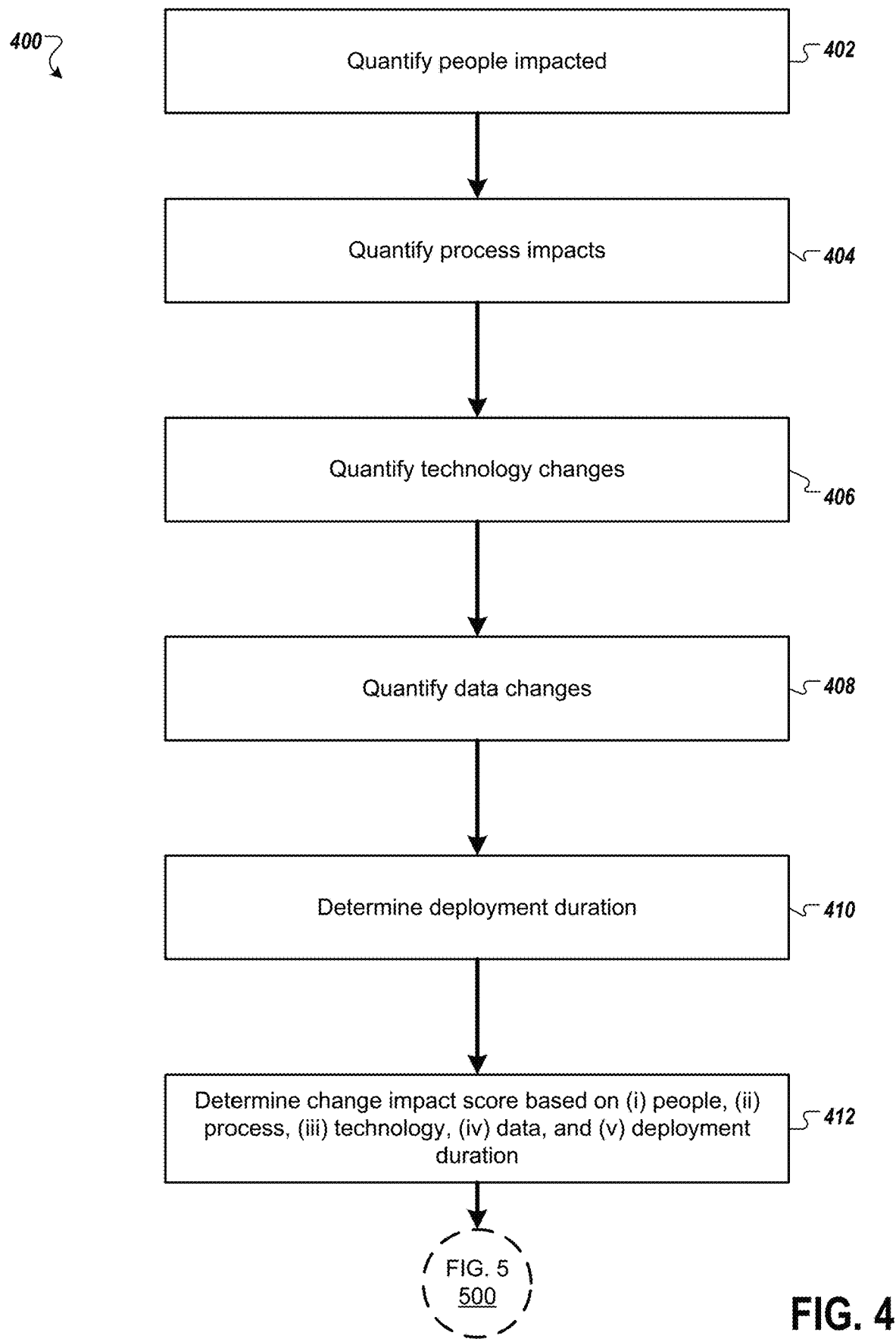
FIG. 4 is a flowchart of a process for determining a change impact score.

Change impacts can be quantified in 304 (e.g., refer to FIG. 4). As described herein, the change management system can determine numeric values for one or more metrics (e.g., people, process, technology, data, deployment duration). These numeric values can be scaled and/or weighted to determine an impact score for the proposed change policy.

Figure 5:
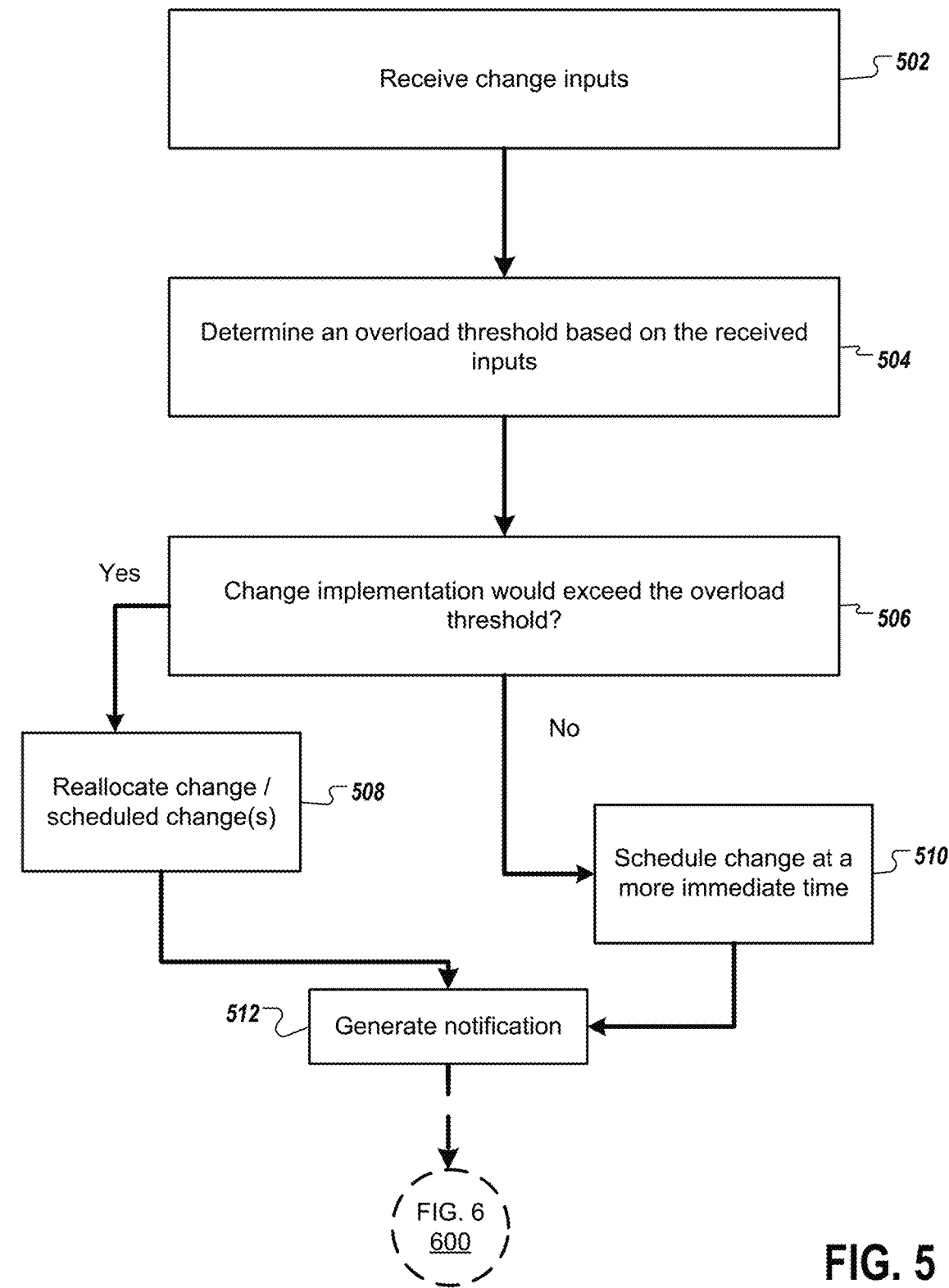
FIG. 5 is a flowchart of a process for scheduling change.

Change implementations can be scheduled in 306 (e.g., refer to FIG. 5). As described herein, the scheduling system can generate and/or modify change schedules/roadmaps based on the change impact score. For example, the scheduling system can determine that the change impact score exceeds a threshold value and therefore the associated change should be slotted for a later implementation date. The threshold value can be a maximum load or amount of change that the team, department, facility, and/or region can take on at a particular time. The scheduling system can review a change schedule and determine whether change already slotted in the schedule should be moved around to accommodate for the proposed change, the change impact score, and/or other readiness metrics.

Figure 6:
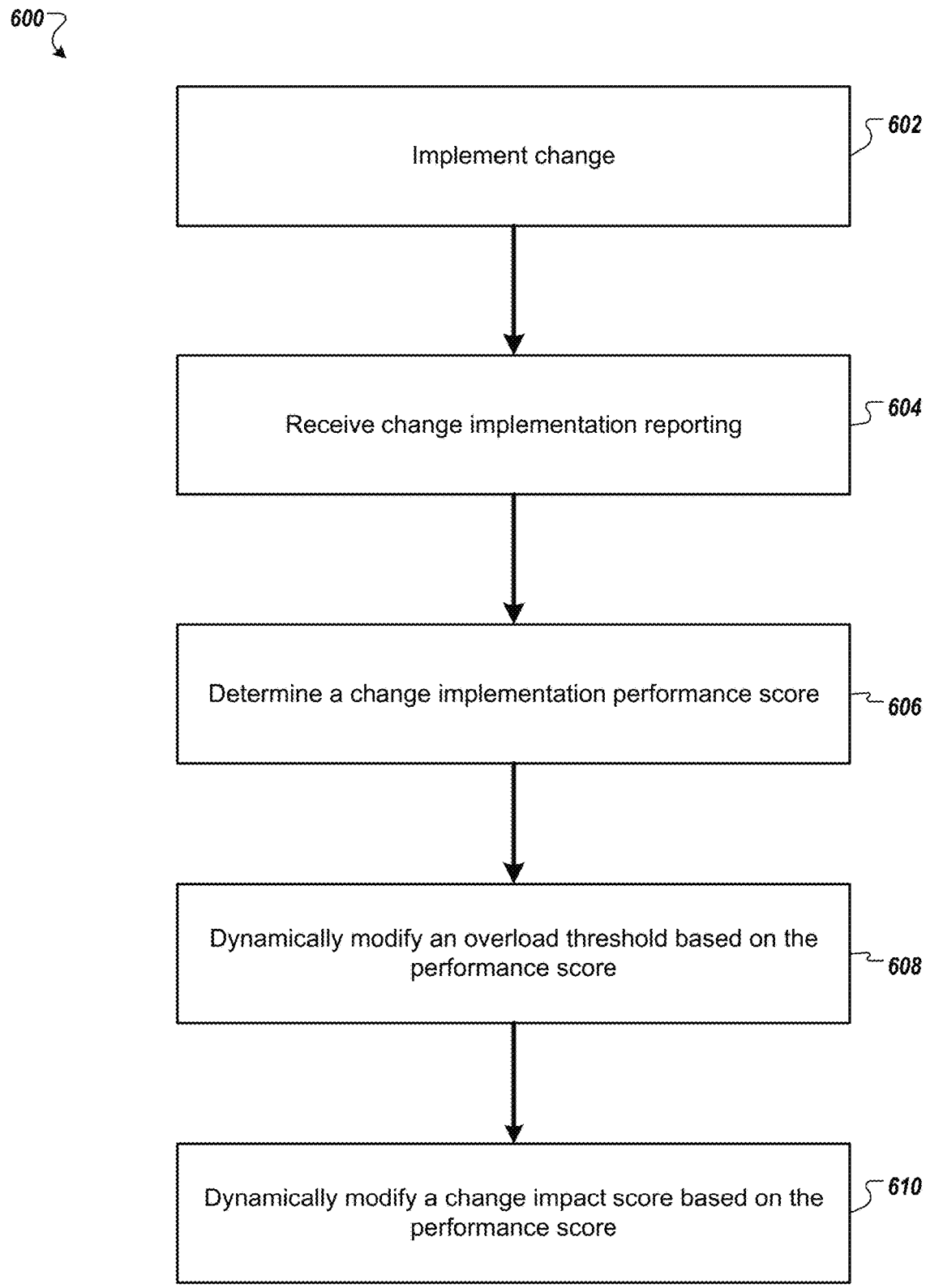
FIG. 6 is a flowchart of a process for determining an ability to implement change.

Performance relative to the change implementations can be assessed in 308 (e.g., refer to FIG. 6). In other words, once change implementations are scheduled (306), the schedules can be provided to employees (e.g., the employee who proposed the change) and the change can be implemented. As the change is implemented and/or after implementation, the change management system can receive information about the implementation. It can be determined how effective, sustainable, and/or effective the implementation was and/or any effects that the implementation had on change and readiness metrics described herein.

Readiness for change can also be assessed in 310 (e.g., refer to FIG. 6). Factors such as external conditions (e.g., seasonal changes, holiday, natural disaster, etc.), team health, and team performance readiness can be quantified and used to determine whether a team is ready to take on the proposed change.

308 and 310 can be performed at one or more different times than depicted in the process 300. For example, assessing readiness (310) can be performed before change impacts are quantified (304), before change implementations are scheduled (306) and/or before performance is assessed (308). As another example, assessing performance (308) can be performed after readiness is assessed (310).

Training can be performed based on performance and readiness in 312. In other words, algorithms, models, and/or other techniques used in 304-310 can be improved or adjusted dynamically and over time. Such training can improve accuracy in quantifying and scheduling change as well as assessing performance and readiness. For example, the change management system can receive information about actual implementation of the change policy. The system can compare that information to the determinations made in 304-310 to determine an accuracy of those determinations. The system can then update or modify the algorithms, models, and/or techniques used as well as any of the determinations made in 304-310.

The process 300 can be repeated. For example, the process 300 can be a closed feedback loop. One or more of 304-310 can be performed and dynamically modified based on actual implementation of change or any other relevant information (e.g., change in an environment, like a natural disaster) that is received.

FIG. 4 is a flowchart of a process 400 for determining a change impact score. The process 400 can be performed by the change management system 110, as described herein. The process 400 can also be performed by one or more other computer systems.

Referring to the process 400, people impacted can be quantified in 402. A people impacted score can be determined based on one or more factors. The people impacted score can be a numeric value that is scaled and/or weighted based on the factors. Such factors can include but are not limited to a competency of people impacted by the change, a behavior of people impacted by the change, a reaction to change, roles of people impacted, and/or departments that are impacted. For example, people who are not often impacted by change may not be competent about how change is implemented or what change entails. This can increase the people impacted score. As another example, if a lot of people are impacted by the change, the people impacted score can increase. If people impacted by change have a generally negative attitude towards change, the people impacted score can increase. If people have, in the past, positively responded to change, the people impacted score can decrease. Likewise, if they reacted negatively to similar change in the past, the people impacted score can increase. As yet another example, if few roles are impacted, the people impact score can decrease. If many different roles are impacted, this can suggest that change implementation can be more challenging, so the people impact score can increase. Likewise if only one department is impacted, the people impact score can decrease. However, if many departments are impacted, the people impact score can increase. The people impact score can also be scaled appropriately based on how many people are impacted by the proposed change. For example, if only one department is impacted but the department has an amount of people that exceeds some threshold value, then the people impact score can increase. One or more other variations on the people impacted score determination can be realized.

Process impacts can be quantified in 404. A process impact score can be determined based on one or more factors. The score can be a numeric value that is scaled and/or weighted based on the factors. Such factors can include actions or steps required to accomplish the change, a quantity of process actions, changes per function, and/or changes across different functions. Functions can include overarching processes that are made up of numerous steps or actions. For example, if many actions or steps are needed to implement the change, then the process impact score can increase. If minimal steps are needed to implement the change, then the process impact score can decrease. As another example, if the change process includes a quantity of actions that exceeds a predetermined threshold level, the process impact score can increase. If the change process includes change per function that exceeds a predetermined threshold level, the process impact score can increase. As yet another example, if the change process includes change across a number of functions that exceeds a predetermined threshold level, then the process impact score can increase.

The process impact score can also be scaled appropriately based on how much process changes are expected by the proposed change. For example, if a quantity of total process changes exceed a predetermined threshold value, the process impact score can increase relative to any of the other factors described herein with regards to determining the process impact score. One or more other variations on the process impact score determination can be realized.

Technology changes can be quantified in 406. A technology impact score can be determined based on one or more factors. The score can be a numeric value that is scaled and/or weighted based on the factors. Such factors can include a quantity of technology fixes, a magnitude of such fixes, a quantity of technology enhancements, a magnitude of such enhancements, new technology's capability for deployment in an existing system, a new technology system and deployment of that system, new automation or machinery with existing systems, and/or new automation or machinery with new systems.

For example, if the quantity of technology fixes exceeds a threshold value, the technology impact score can increase. If the magnitude of technology fixes exceeds a threshold value, the technology impact score can increase. As an example, if only a few technology fixes are required by the change but those fixes require substantial resources (e.g., time, money, people, hardware, etc.), then the technology impact score can increase. As another example, if the magnitude of fixes typically would be high but the team has an appropriate skill level to handle these fixes, then the technology impact score can decrease. Likewise, if the quantity of technology enhancements exceeds a threshold value, the technology impact score can increase. If the magnitude of such enhancements exceeds a threshold value, the technology impact score can also increase.

As another example, if new technology is being introduced and that new technology can be easily deployed in the existing system, then the technology impact score can decrease. If, on the other hand, the new technology cannot be easily deployed in the existing system (e.g., requires training, updates or enhancements in the existing system, etc.), then the technology impact score can increase. If a new technology system is being introduced and it can be easily deployed, then the technology impact score can decrease. On the other hand, if the new technology system can be harder to deploy (e.g., requires training/onboarding, migrating data or information from the old system to the new system), then the technology impact score can increase.

As yet another example, if the proposed change requires new automation or machinery with the existing system and that integration can be challenging, the technology impact score can increase. Similarly, if new automation or machinery is brought in with new systems, which requires significant onboarding or other challenges, then the technology impact score can increase.

The technology impact score can also be scaled appropriately based on how many technology changes may result from the proposed change. For example, if an overall quantity of technology changes exceeds some threshold value, then the technology impact score can increase. One or more other variations on the technology impact score determination can be realized.

Data changes can be quantified in 408. A data change score can be determined based on one or more factors. The score can be a numeric value that is scaled and/or weighted based on the factors. Such factors can include a change in metrics, a change in reporting, and/or a change in visualization or user interfaces of data. As an example, the proposed change can require one or more new metrics to be understood and/or adopted by people. If the new metrics are hard to understand and/or require training/onboarding, the data change score can increase. In other words, if the new metrics require an amount of training that exceeds a threshold value, the score can increase. In some implementations, if only one new metric is being introduced but it requires significant training, the data change score can increase. If the new metrics are merely variations of existing metrics, the data change score can decrease. As another example, if the proposed change requires updating or modifying one or more existing metrics, the data change score can be adjusted accordingly based on a quantity of such updates, a difficulty in making such updates, a difficulty level of training to use/understand the updates, etc.

As another similar example, if data reporting changes are expected, the data change score can be adjusted accordingly, based on how much the reporting changes, whether new reporting tools, displays, views, or other functionality are being added, whether old reporting is merely being updated, etc. Moreover, the data change score can be adjusted accordingly based on whether GUIs change, new GUIs are used, and/or one or more other visual changes are expected with the proposed change. For example, the more changes made to GUIs, the more likely the data change score can increase, especially if the changes are new and/or require additional onboarding.

The data change score can also be scaled appropriately based on how many data changes are expected in the aggregate. For example, if the data changes are minimal but a quantity of overall data changes exceeds some threshold value, the data change score can increase. One or more other variations on the data change score determination can be realized.

A deployment duration can be determined in 410. The deployment duration can be quantified as a duration score, like the other scores described herein. The deployment duration can cover a period of time from start of change implementation to completion of that change. An employee who proposes the change can provide an estimate of how long the change will take. In some implementations, the change management system can predict how long the change will take, based on historic trends or analysis of prior change implementations. The deployment duration can also take into account one or more timing constraints, expected roadblocks, and/or anticipated or projected roadblocks (e.g., natural disaster, holiday season, other seasonal conditions, etc.). The longer duration of the proposed change, the more likely the duration score can increase.

A change impact score can be determined based on (i) people, (ii) process, (iii) technology, (iv) data, and (v) deployment duration in 412. In other words, the scores generated in 402-410 can be added together, weighted, and/or scaled to determine the change impact score (e.g., refer to FIG. 8). For example, one or more of the people, process, technology, data, and duration scores can be weighted against one or more other metrics. These other metrics can include external factors, team health, and/or performance readiness, as described throughout this disclosure. The change impact score can also be dynamically modified and/or weighted against such performance metrics once change is actually implemented. As a result, the modified change impact score can be used for determining and/or scheduling future, subsequent change. In other examples, the change impact score can be modified or weighted against historic performance metrics even before the change is actually implemented.

Additionally or alternatively, as depicted, the process can proceed to process 500 in FIG. 5. Moreover, the threshold values described in reference to the process 400 can be determined based on a particular team, department, facility, and/or region. The threshold value can also be determined based on one or more readiness metrics, such as performance, team health, and/or external factors. The threshold value can also be a general value that relates to any change in an enterprise or a type of change in the enterprise. The threshold value can also be dynamically adjusted over time as change is implemented and one or more metrics or other change values are realized.

FIG. 5 is a flowchart of a process 500 for scheduling change. The process 500 can be performed by the change management system 110, as described herein. The process 500 can also be performed by one or more other computer systems.

Referring to the process 500, change inputs can be received in 502. One or more of the inputs can include a change impact score (e.g., refer to FIG. 4), an external readiness score, a team health score, a performance readiness score, and/or historic implementation data. As described herein, the external readiness score can be a numeric value associated with conditions outside of a team or enterprise that impact operations of the team and/or enterprise. Example conditions include a natural disaster, a holiday, and seasonal changes. The team health score can indicate how exhausted the team is. This score can be determined over a predetermined amount of time, such as the past 8 weeks. This score can be relative to how much work the team has completed over a certain amount of time. The performance readiness score can indicate how the team has handled change in the past and/or how much change the team, facility, or enterprise can handle at a given time. This score can also be determined over a predetermined amount of time, such as the past 8 weeks. Historic implementation data can be incorporated into any one or more of the scores described herein. The data can also include information about prior change implementations and/or previously determined change impact scores or other scores.

An overload threshold can be determined based on the received inputs in 504. External factors can alter a capacity for change in the team, facility, and/or enterprise. As an example, an external readiness score can be a higher value when there is a natural disaster. The higher value can indicate that the team is performing or operating overcapacity (e.g., under significant stress) due to the natural disaster or other external factor. This higher value can lower a capacity of the team to take on change by lowering the team's overload threshold. In other words, because the natural disaster is taking over whatever capacity the team did have to implement change, change should not be implemented at that time (e.g., the change impact score would exceed the overload threshold). In situations where the external readiness score may not cause the team's threshold capacity to change (e.g., the team routinely handles seasonal holidays the same way and is not overwhelmed by the holidays), an upper limit of the team's overload threshold capacity for change can be increased (e.g., which means that the team is able to take on change and/or handle more stress).

The team health score can also impact the team's capacity to take on change. For example, if, over the past 8 weeks, the team experienced a busy period of work, then the team health score can receive a value indicative of a corresponding level of exhaustion. In some implementations, the more exhausted the team is, the higher the team health score. When weighted against the change impact score, the team's overload threshold can be lowered. A lower overload threshold can indicate that the team may be unable to take on or implement change at a present time, or until the team health improves. As another example, if, over the past 8 weeks, the team has steadily been performing its tasks, the team health score can receive a value indicative of less exhaustion and more energy. When weighted against the change impact score, the team's overload threshold can be raised. A higher overload threshold can indicate that that the team has energy or capacity to take on or implement proposed change.

The performance readiness score can also impact the team's capacity to take on change. The performance readiness score can indicate how the team handled change in the past. This score can also indicate how much change the team can take on at any given time. As an example, if the team has been positively responsive to past change(s), the performance readiness score can receive a value indicative of a corresponding level of performance. When weighted against the change impact score and/or any of the other inputs received in 502, the team's overload threshold can be raised. In other words, the team has increased capacity or capability to implement proposed change. As another example, if the team handled change poorly in the past, experienced problems in implementing past change(s), is not adaptable to change, and/or cannot handle much change at any given time, then the performance readiness score can receive a value indicative of a corresponding low level of performance. When weighted against the other inputs, the team's overload threshold can lowered, which means that the team has reduced capacity or ability to implement the proposed change at a given time.

Once the overload threshold is determined, it can be determined whether implementing the proposed change would exceed the overload threshold (506). If the change would exceed the threshold, then the change and/or already scheduled changes can be reallocated in 508. In some implementations, a computer system (e.g., the scheduling system 112) can adjust a schedule including changes and the proposed change. In other implementations, an employee, such as a team leader, can make adjustments to the schedule. If the proposed change would not exceed the threshold, then the change can be scheduled at a more immediate or present time in 510. As mentioned in reference to 508, the scheduling can be performed by an employee and/or by the scheduling system 112.

In some implementations, a computer system (e.g., the change management system 110) can predict when the team, department, facility, or region is going to be overwhelmed and unable to implement change. The computer system can dynamically adjust the overload threshold accordingly, and provide a notification to the team, department, facility, or region leader indicating that the change should not be implemented at a present or particular time.

A notification can be generated in 512. The notification can indicate that implementing the change can put the team at risk. The notification can also indicate that implementing the change will be unsustainable. Moreover, the notification can indicate that the proposed change is can be implemented. The notification can also provide scheduling guidance, which can be used by workers, such as the team leader, to schedule or plan when the change will be implemented. The notification can be provided to the team leader, team members, and/or other members of the organization. The notification can also be provided to the change management system 110 and/or the scheduling system 112 to adjust one or more scores, metrics, and/or schedules.

As an example, the overload threshold can be 2,000. Any change impact score that exceeds 2,000 can put the team at risk. In some implementations, a change impact score that exceeds the overload threshold can be further bucketed or categorized based on how much the change impact score exceeds the overload threshold. For example, a change impact score of 2,500 can be unsustainable. Therefore, that change impact score can be flagged as too risky or unsustainable. The flagging can include assigning the change impact score with a color, such as red. A change impact score that exceeds the overload threshold but only by an amount that is less than the unsustainable limit can be flagged with a yellow or orange color. Notification of this risk can be provided to the team leader, who can more appropriately plan scheduling of the proposed change.

Moreover, the overload threshold can be modified according to the level of risk associated with implementing the change in 506-512 (e.g., refer to FIG. 6). For example, if the change would be unsustainable (e.g., the change impact score is flagged as red), then the overload threshold can be lowered. Lowering the overload threshold can indicate that the team does not have the capacity to implement any change at a particular time.

Additionally or alternatively, as depicted, the process 500 can proceed to process 600 in FIG. 6. Moreover, the overload threshold described in reference to the process 500 can be determined for a particular team, department, facility, and/or region. As described herein, the overload threshold can be dynamically adjusted over time as change is implemented and one or more metrics, scores, or other change values are realized.

FIG. 6 is a flowchart of a process 600 for determining an ability to implement change. The process 600 can be performed by one or more computer systems as described herein. Referring to the process 600, change can be implemented in 602. For example, change that was proposed by an employee, such as a team leader (e.g., refer to FIG. 1), can be implemented in the team, department, facility, and/or region. The change can be implemented according to the corresponding change policy.

Change implementation reporting can be received in 604. The reporting can be received in real-time, during implementation, after implementation, and/or during any times of the deployment duration. For example, reporting can be received at set times during deployment (e.g., at initiation/start, midway through, and at the end). Employees can report information about the change implementation. The employees can complete online questionnaires or evaluations provided via applications or websites on mobile devices (e.g., refer to FIG. 1). The team leader or a leader of the change implementation can report the information. The information can also be received from databases or other systems that track the change, performance, and/or operation within the team, department, facility, and/or region. The reporting can include information about whether implementation is going as projected or planned, what steps/actions have been completed, responses/attitudes/behaviors of people impacted by the change, any obstacles (expected or unexpected) that occur during the change, etc.

A change implementation performance score can be determined in 606. For example, the information received in 604 can be quantified into a numeric value. In other implementations, the reporting received from the employees can include numeric scores or ratings that are completed by the employees. The numeric scores can be aggregated to determine the overall change implementation performance score. In some implementations, a higher change implementation performance score can indicate that the team's performance is poor. In other words, the team may not be accepting the change, may not be implementing it according to the change policy, or otherwise is struggling with the change implementation. One or more different scoring techniques can be used to determine the change implementation performance score in 606.

An overload threshold can be dynamically modified based on the performance score in 608 (e.g., refer to FIG. 5). As mentioned in reference to FIG. 5, the overload threshold can be a determination of how much capacity the team has to take on or implement change. Therefore, if the performance score exceeds a predefined value, then the overload threshold can be lowered. This can indicate that the team is poorly performing in the change implementation and therefore the team does not have the capacity to take on or implement change at a present or particular time. The predefined value can be based on goal metrics. Goal metrics can change based on node type. Example node types can be buildings or distribution centers that fulfill stores and buildings that fulfill other buildings or distribution centers. The predefined value can vary based on a time of year, even though it can be the same per node type. In other words, goal metrics can change based on whether it is a busier season or time of year, an overall volume experienced at the node type, etc.

As another example, if the performance score is less than the predefined value, then the overload threshold can be raised. This can indicate that the team is performing well in implementing the change and therefore can have the capacity to take on or implement change at the present or particular time.

A change impact score can also be dynamically modified based on the performance score in 610 (e.g., refer to FIG. 4). The change impact score for the change that is currently being implemented can be adjusted. As an example, if the performance score is high because the team is poorly implementing the change, more people may be required to improve implementation and/or complete implementation. Therefore, the people metric of the corresponding change impact score can be modified to reflect that more people are impacted by the change. A change in any one or more of the metrics that are used to calculate the change impact score (e.g., refer to FIG. 4) can cause a change in the overall change impact score for that change.

In some implementations, multiple change impact scores can be modified. For example, if current implementation of a first change impacts a number of people who need to perform a second change, then a change impact score of the second change can be adjusted to reflect the impact of the current implementation of the first change on the people metric of the second change.

The process 600 can be repeated during a lifecycle of the change implementation. Moreover, the overload threshold and/or the change impact score can be adjusted in real-time during any phase of the change implementation and/or at predetermined times or phases during the change implementation (e.g., at a beginning of implementation, a midway point, and an end of the implementation). Dynamic modification of the change implementation performance score, overload threshold, and/or change impact score(s) can be advantageous to provide for more accurate determination of ability to implement change, scheduling change, and maintaining sustainability.

FIG. 7A depicts example data fields for change impact assessment. The change impact assessment application 206 described in reference to FIG. 2 can be presented at a user device of an employee, such as a team leader. User interface features 700 can be displayed in the application 206 at the user device (e.g., user device 200 in FIG. 2). The user interface features 700 can include a plurality of data entry fields for the employee to provide input. This input can be used by the change management system 110 in determining a change impact score and/or one or more other metrics, scores, and/or schedules.

Example data fields include initiative/project 701, project manager 702, region 704, location(s) 706, start/end dates 708, initiative duration 710, department(s) impacted 712, role(s) impacted 714, and level(s) impacted 716. One or more fewer or additional data fields can be provided through the application 206. For example, multiple data fields that are associated with each of the metrics used to determine the change impact score (e.g., people impacted, process changes, technology impact, data impact, deployment duration) can be displayed in the application 206. The employee can also provide information such as an updated date for starting or ending the change initiative, an updated number of people needed to implement the change, and/or any other updates or modifications to information that the employee initially provided to the application 206. In some implementations, a computer system, such as the change management system 110, can predict certain values, inputs, or information for the proposed change. As a non-limiting example, the system can predict an end date (e.g., data field 708) for the proposed change, roles impacted (e.g., data field 714), and/or initiative duration (e.g., data field 710).

FIGS. 7B-C depict example graphical user interfaces (GUIs) for change impact assessment. The change impact assessment application 206 includes the user interface features 700, as described in reference to FIG. 7A. Referring to both FIGS. 7B-C, different input features can be provided to the employee. For example, text fields, drop-down menus, calendar pop-ups, and radio buttons can be presented in the application 206.

Moreover, as depicted in FIG. 7C, one or more additional data fields can be presented to the employee. For example, the employee can be prompted to respond to questions such as, "at a site, how many people will be impacted," "how many processes will be impacted," "how is technology impacted," etc. The employee's responses to these questions can be used by the change management system 110 to quantify the proposed change and generate an appropriate change impact score. One or more other questions can be presented to the employee via the application 206.

FIG. 8 depicts a table 800 for determining the change impact score. The change impact scoring table 800 can demonstrate how one or more metrics are calculated and weighted to determine an overall change impact score for a proposed change, as described herein (e.g., refer to FIG. 4). The metrics included in the table 800 can be scalable to any team, department, facility, site, and/or region, no matter a size or type of that location.

As depicted in the table 800, a size of impact can be bucketed into small, medium, large, and x-large sizes. A small impact can correspond to an intellectual impact, which can have a value from 1-3. A medium impact can correspond to an emotional impact, which can have a value from 5-8. A large impact can correspond to a personal impact, which can have a value of 13. An x-large impact can correspond to all impacts, which can have a value of 21. One or more other values, sizes, and/or scoring conventions can be realized or adopted to determine the overall change impact score.

A people score 802 can be calculated based on whether the impact to the people is small, medium, large, or x-large. People impacted can depend on what a person does, including their competencies and behaviors that can be essential to performing well in their job capacity. As depicted in the table 800, if no people are impacted, the impact is small and the score 802 can be assigned a value of 1. If there are certain merit or exempt roles in a building that are impacted, then the impact is still small but the people score 802 can be assigned a value of 3. If there are certain merit or exempt roles in a department(s) that are impacted, then the impact can be medium sized and the people score 802 can be assigned a value of 5. If a progression role for one department is impacted, the impact can be medium and the score 802 can be assigned a value of 8. If a progression role for two departments or an entire exempt team are impacted, then the impact can be large and the score 802 can be assigned a value of 13. Moreover, if three or more departments are impacted, then the impact is x-large and the score 802 can be assigned a value of 21.

A process score 804 can be calculated based on whether the process impact is small, medium, large, or x-large. Process impact can depend on actions or steps required to achieve a desired outcome in the proposed change. As depicted in the table 800, if process changes occur to 1-3 in a same function, the impact is small and the score 804 can be assigned a value of 1. If there are 1-3 process changes across different functions, the impact is still small but the score 804 can be assigned a value of 3. If there are 4-9 process changes in the same function, then the impact is medium and the score 804 can be 5. If the process changes occur to 4-9 across different functions, then the impact can still be medium but the score 804 can be 8. If there are 10+ process changes in the same function, the impact can be large and the score 804 can be 13. If the process changes occur to 10+ across different functions, then the impact can be x-large and the score 804 can be assigned a value of 21.

A technology score 806 can be calculated based on whether a technology impact is small, medium, large, or x-large. The technology impact can depend on whether automated applications are organized to meet business objectives. As depicted in the table 800, if technology fixes are to be made to existing systems, the impact can be small and the technology score 806 can be assigned a value of 1. If the change requires technology enhancements to existing systems, the impact can be small but the score 806 can be assigned a value of 3. If the change requires new technology that is capable of being deployed in a current system, the impact can be medium and the score 806 can be 5. If the change requires a new technology system and capability for deployment, then the impact can still be medium but the score 806 can be 8. If the change requires new automation or machinery with no new technology to operate, the impact can be large and the score 806 can assigned a value of 13. Finally, if the change requires new automation or machinery with a new application or system to operate, the change impact can be x-large and the score 806 can be assigned a value of 21.

A data score 808 can be calculated based on whether the impact on data is small, medium, large, or x-large. Data impacts can depend on metrics, reporting, and/or visualization that is organized to communicate information and make decisions by employees. As depicted in the table 800, if a new view, such as a card or chart, is made or required, the impact is small and the score 808 can be assigned a value of 1. If the change requires a new defect (e.g., PPS down adjustments into order cancels), then the impact can still be small but the score 808 can be 3. New defects are tied to quality insurance. New defects can indicate where a step in a function, for example, was performed incorrectly. As an illustrative example, if a sticker is placed on a box in a wrong position, the sticker may have to be reprinted. This is a new defect that can be reported as a measure of how often stickers are reprinted.

If the change requires new metric building, then the impact can be medium and the score 808 can be 5. If the change requires a new metric to be added to a daily conversation, then the impact can still be medium but the score 808 can be 8. If the change requires new behavior expectations due to metric performance, the impact can be large and the score 808 can be 13. Finally, if the change requires new user interfaces for an operational reporting platform, the impact can be x-large and the score 808 can be assigned a value of 21.

A duration score 810 can be calculated based on whether how long the change implementation will last. Duration can depend on a time to deploy, a time to ramp up, and/or a time to execute. As depicted in the table 800, a duration of 1-2 weeks can be classified as small and the duration score 810 can be assigned a value of 1. A duration of 3-4 weeks can still be small but the score 810 can be 3. A duration of 5-6 weeks can have a medium impact and the score 810 can be 5. A duration of 7-9 weeks can still be medium but the score 810 can be 8. A duration of 10-15 weeks can be classified as a large impact and the score 810 can be 13. Finally, a duration of 16+ weeks can be classified as an x-large impact and the score 810 can be assigned a value of 21.

As mentioned above, any one or more scores, factors, sizes, and/or values can be used in the table 800 because the table 800 can be adapted to any size or type of change, team, department, facility, region, and/or organization.

Moreover, as depicted in FIG. 8, the change impact score 812 can be determined using a formula in which the people score 802 is multiplied by a sum of the process score 804, the technology score 806, the data score 808, and the duration score 810. The people score 802 acts as the multiplier so that the formula takes into account all team members as well as leaders. After all, more people that adopt the change should have greater representation.

Figure 9:
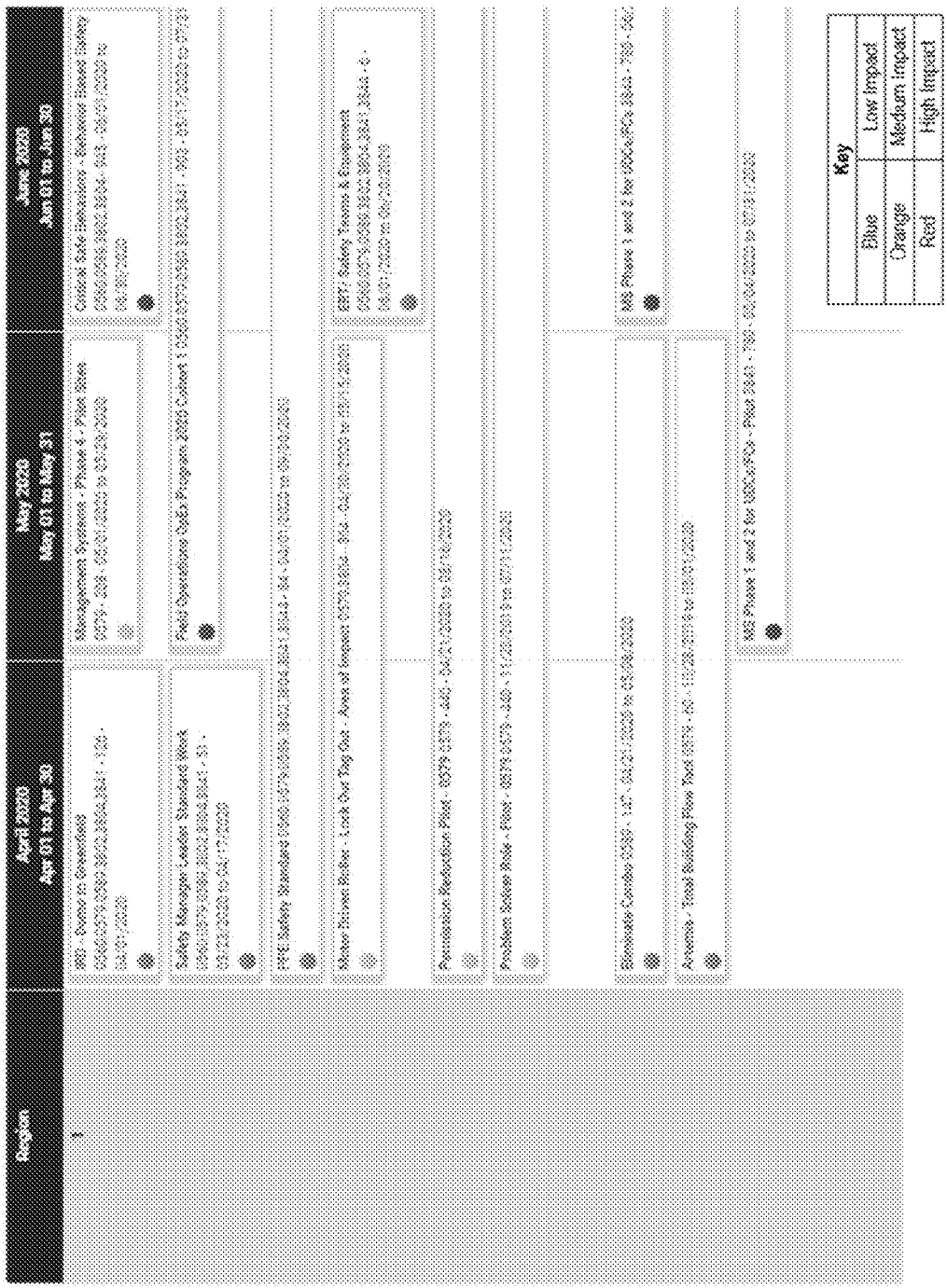
FIG. 9 is an example change impact roadmap for an enterprise.

FIG. 9 is an example change impact roadmap 900 for an enterprise. One or more other roadmaps can be specific to a region, facility, department, and/or team. Thus, roadmaps can be generated as granular and as overviews such that performance and capability to implement change can be measured across different levels of the enterprise. These different roadmaps can assist the enterprise in being more sustainable and in having successful change implementation. The roadmap 900 can be advantageous to get a view or sense of what change is coming the pipeline for any level of the enterprise. As a result, employees or other users (e.g., team leaders, operation managers, etc.) can better plan change initiatives, deployment, and other conditions or actions in the enterprise.

As depicted in the roadmap 900, one region, region 1, is depicted. Change implementations are scheduled based on month. The roadmap 900 demonstrates all the changes that are planned for months of April 2020, May 2020, and June 2020. Although not depicted, the roadmap 900 can include changes that are planned for one or more months of the year. The roadmap 900 can also include changes that are planned for one or more other regions over a same period of time. The roadmap 900 can also include a key, to assist an employee or other user in understanding the roadmap 900. The key can indicate one or more colors or other types of codes that correspond to different impact levels for the scheduled changes. For example, a blue circle can indicate that the change has a low impact (e.g., a low change impact score relative to other planned changes). An orange circle can indicate that the change has a medium impact. A red circle can indicate that the change has a high impact.

Change initiatives (e.g., planned changes in the roadmap 900) can be organized by region. Change initiatives can also be sorted or organized based on key dates. For example, holidays or dates when products go to stores can require result in change initiatives that are high impact being pushed to another date. As another example, a high impact change initiative can be scheduled on the roadmap 900 before a critical date, like a holiday, to ensure that the change is completed before that critical date. Change initiatives can also be sorted based on cyclical processes, which are activities that may take up bandwidth but are customary events or processes for the enterprise (e.g., according to an HR calendar).

Each planned change in the roadmap 900 can include an initiative title, an impact indicator, location(s) impacted, a change impact score, and a duration of deployment. One or more fewer or additional information can be included for each planned change. As described above, the impact indicator can be a color indication of impact level of the change. In some implementations, the change can impact multiple locations, such as facilities, stores, departments, and teams. The change impact score can be an aggregate score for the planned change. The score can be the same across all impacted locations. In other implementations, multiple change impact scores can be associated with the planned change, where each of those scores corresponds to a different impacted location. The duration of deployment can be an amount of projected time from starting the change initiative to completing the change initiative. The duration of deployment can also be an amount of time before a product associated with the planned change goes live in the business (e.g., the product is brought to market for consumers in stores, the product is used by employees to improve their workflows, etc.).

Figure 10:
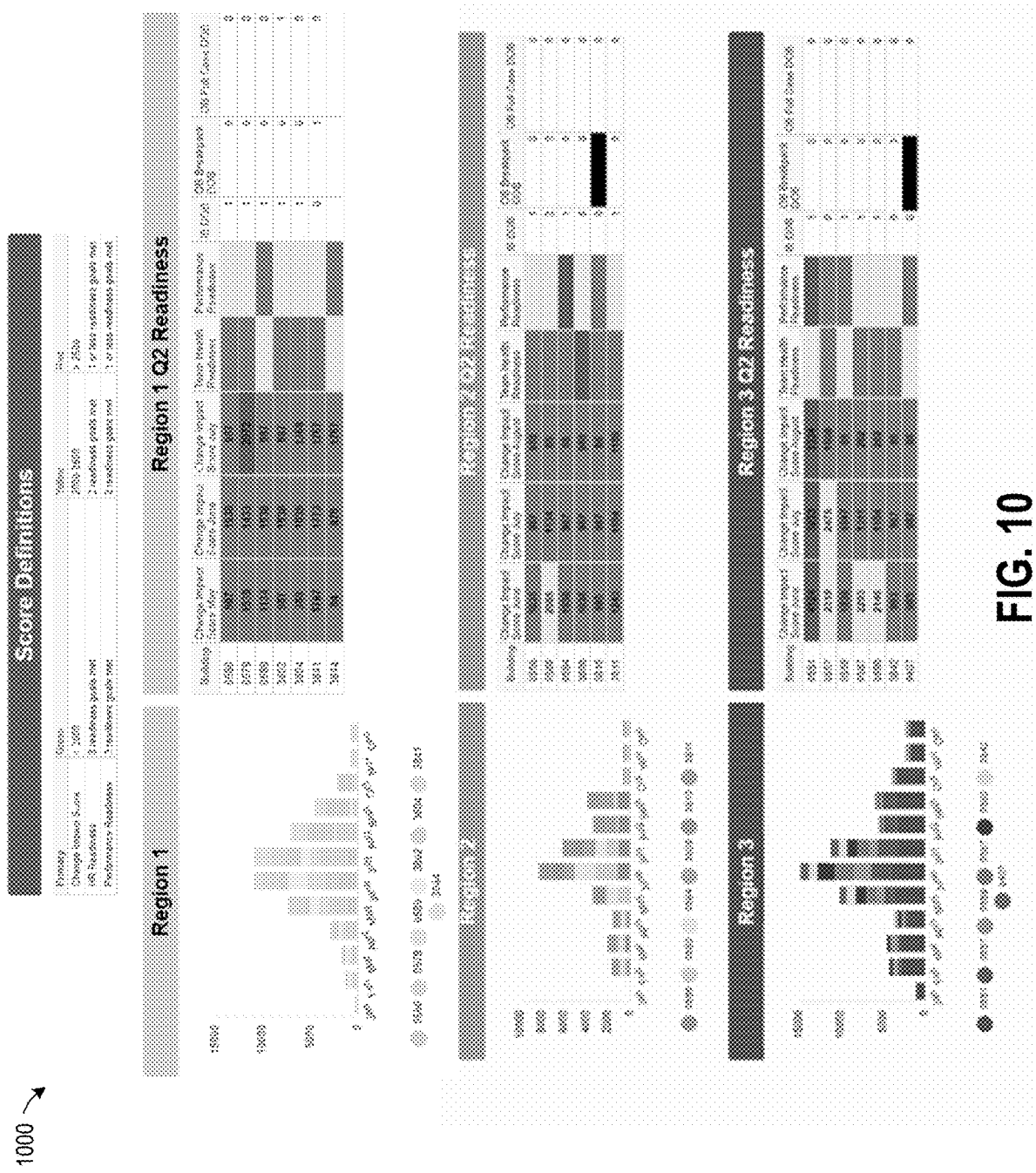
FIG. 10 depicts example change impacts across different regions in the enterprise.

FIG. 10 depicts example change impacts across different regions in the enterprise. The change impacts across different regions can be displayed in a GUI 1000. The GUI 1000 can be presented at user devices of one or more employees of the enterprise (e.g., refer to the user device 200 in FIG. 2). For example, a team leader, change scheduler, or other employee of the enterprise can view the GUI 1000 to assess change impacts across different regions of the enterprise. One or more other metrics, displays, or information can be displayed in the GUI 1000.

The example GUI 1000 includes score definitions, and graphical and tabular depictions of performance readiness for regions 1, 2, and 3. In this example, the readiness for each of the regions are depicted for a second quarter (Q2). The score definitions can be a table or key describing colors and other performance indicators used in the graphical and tabular depictions. For example, a change impact score is in the green when that score is less than 2,000. When that score is 2,000-2,500, the corresponding color is yellow. When that score is greater than 2,500, the corresponding color is read. Similarly, an HR readiness metric is green when 3 readiness goals are met, yellow when 2 readiness goals are met, and red when 1 or less readiness goals are met. A performance readiness metric is green when 3 readiness goals are met, yellow when 2 readiness goals are met, and red when 1 or less readiness goals are met. Different scoring techniques can be used, where such techniques correspond to a business or objectives of the enterprise.

The graphs for regions 1, 2, and 3 depict aggregate change impact scores for those regions based on month. As a result, an employee or other user seeing the interface 1000 can get a sense of how much change is happening per month per region. This information can be beneficial to plan how change should be distributed across the region. For example, if all the facilities for a region experience change in one month, then the employee may determine that the change should be distributed over several months or implemented in different facilities at different times to stagger an overall effect of that much change on the region of even enterprise.

The bars in each of the graphs are made up of change impact scores for different facilities (e.g., buildings). For example, as depicted in January, in region 1, only one facility, 0579, experienced any change while in June in region 1, every facility in that region experienced change.

The readiness tables include a breakdown of scores per facility in the region. For example, for each facility, the table can include a change impact score per month, team health readiness score, performance readiness, and one or more additional metrics. In some implementations, each score depicted in the readiness tables can be an aggregate of all related scores for all departments or teams per facility. For example a change impact score of 1,939 for facility 0579 can be an aggregate of all change impact scores for all teams in the facility 0579. The aggregate scores can be further analyzed and broken down into scores per team in order to glean performance information about each team and/or determine where or why certain teams have better change implementation and performance versus other teams in the facility. This more granular analysis can be used to project future performance of individual teams and the overall facility. Metrics can be compared across different teams in the facility to determine maturity or attitude towards change per team and to determine how to improve performance in some teams versus others. Moreover, metrics can be compared across different facilities to improve planning, scheduling, and/or implementation of change in each of the facilities.

Looking at the region 1 Q2 readiness table, facility 0579 had a change impact score of 1,939 for May. This score is green because it is under 2,000. This can be indicative that the facility 0579 successfully implemented change during May and did not exceed an overload threshold for that month. Moreover, this score, as well as other monthly scores in the green, can be related to the notion that the facility 0579 also has a green team health readiness score. This score can indicate that the facility 0579 is not overworked or exhausted from the change that occurred from May-July. However, facility 0579 had a change impact score of 2,972 for July, which put the facility in the red for that month. This can indicate that the facility 0579 underwent significant amounts of change and/or that the facility 0579 was operating at or above their overload threshold. Such an at-risk or unsustainable impact score can be related to the facility's performance readiness score being in the yellow. After all, a yellow performance readiness score can indicate that only 2 readiness goals were met. In one example, the facility 0579 may have struggled with meeting more readiness goals because of the change that occurred in July.

As described herein, readiness metrics can be viewed based on region, facility, quarter, or any other desired timeframe. The different views and displayed information can be useful to identify top down and bottom up issues that may need to be addressed in order for performance and change implementation to improve. For example, a score in the red can cause a notification to be generated and displayed to the employee or other user viewing the interface 1000. This notification can direct the employee's attention to the facility having the red score. The red score can be an indicator that leaders in that facility may not be properly equipped or able to lead the facility through change. Other reasons for the red score can be gleaned from the information displayed in the interface 1000.

As another example, the interface 1000 can provide visibility from the bottom up. In other words, individual employees, such as workers and team leaders, can see what change is coming down the pipe, in the future. As a result, they can better plan for the change and at least be prepared to implement the change when it comes.

Figure 11A:
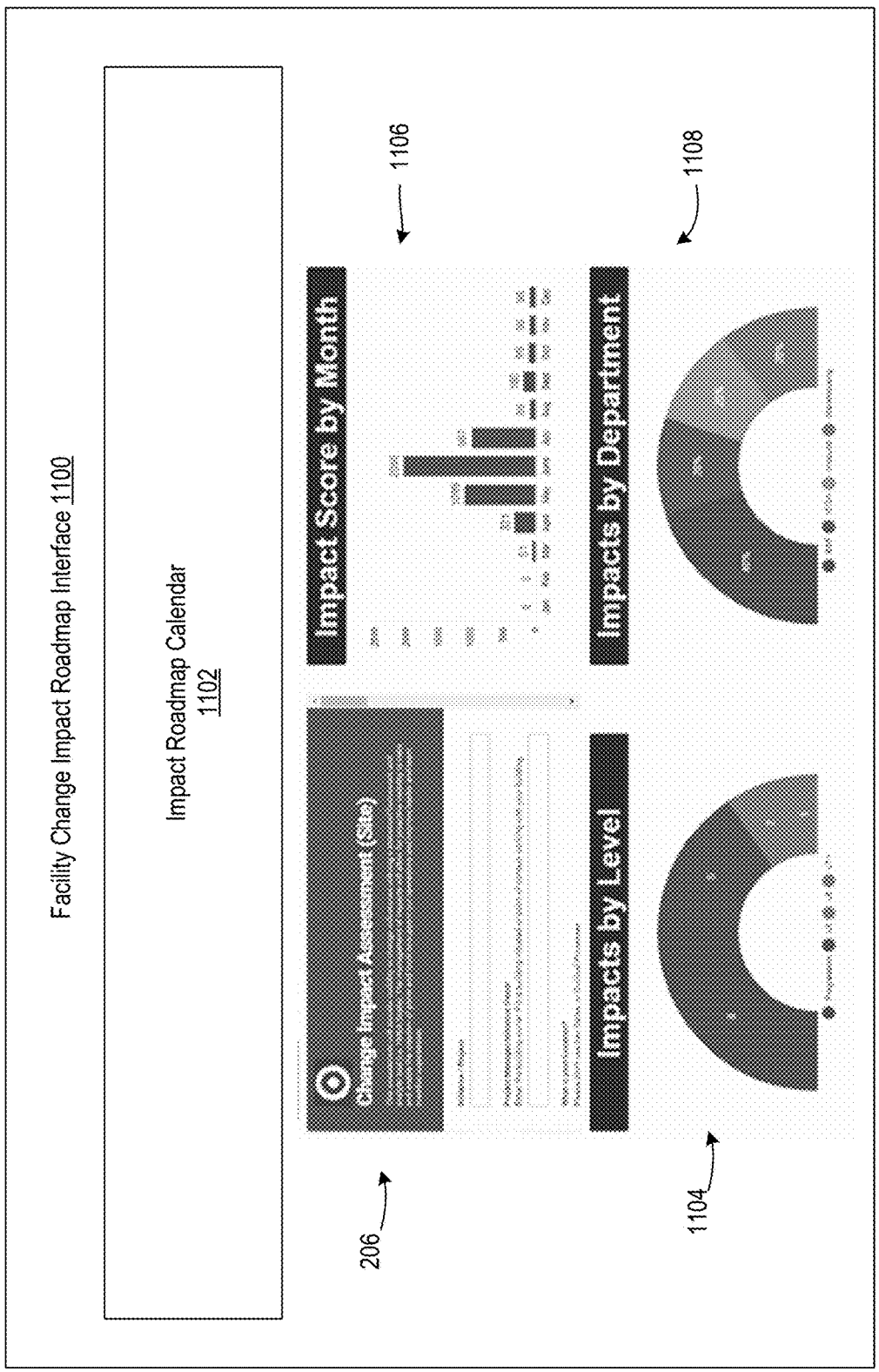
FIGS. 11A-B are example GUI displays of change impact for a facility in the enterprise.
Figure 11B:
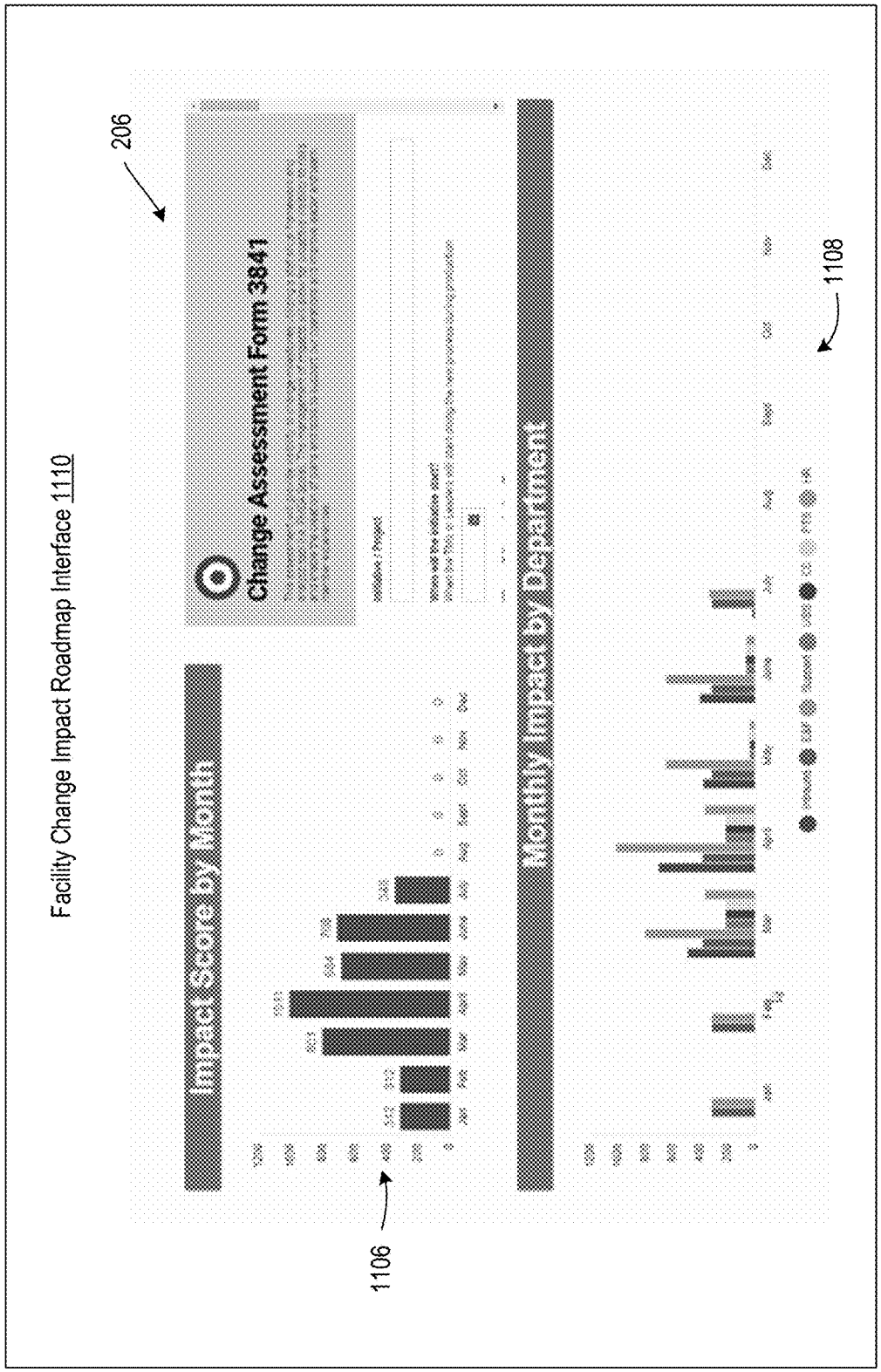

FIGS. 11A-B are example GUI displays 1100 and 1110 of change impact for a facility in the enterprise. As shown in FIG. 11A, the facility change impact roadmap interface 1100 can include views of an impact roadmap calendar 1102 (e.g., refer to FIG. 9), the change impact assessment application 206, an impacts by level view 1104, an impacts by month view 1106, and an impacts by department view 1108. One or more fewer or additional views can be depicted in the interface 1100. Moreover, although not depicted, the interface 1100 can provide similar views of teams in the facility, a region that the facility is located in, and/or other regions.

As depicted, the calendar 1102 and impacts by month view 1106 can be leveled across the building. In other words, the calendar 1102 can include scheduled changes for every team or department within the facility. The impacts by month view 1106 can include aggregate change impact scores for the facility. Although not depicted, the impacts by month view 1106 can optionally be expanded to include impact scores per team per month. In some implementations, the views can also be leveled across a role in the facility (e.g., based on pay grades). The views can also be leveled across roles and departments in the facility. The impacts by level view 1104 can depict change impact scores per level in the facility. Levels can be based on pay grades. As an example, one level can be associated with team managers, another level can be associated with team members tasked with stocking shelves in a store, and another level can be associated with team members tasked with packing boxes in a distribution center. the Each level can also include different positions. Moreover, the impacts by department view 1108 can depict change impact scores per department in the facility. The different views can be advantageous to an employee or other user to determine how the overall facility is performing and implementing change, and whether adjustments need to be made on a facility-wide, department, level, team, or role level.

As an example, if certain departments have low change impact scores, a manager may decide to propose additional change for those departments since those departments can handle the change. If certain departments have high impact scores in comparison to other departments, the manager may choose to shift some of the change from the departments with higher impact scores to the departments with lower impact scores. As a result, the overall impact score for the facility may also be improved, which can have positive impacts on an overall performance of not only the facility but also the region. In some implementations, the manager may choose to shift certain roles or people (e.g., team leaders who handle change well) from one team to another team so that they can assist in better performance and/or change implementation.

As yet another example, a manager can view team health and performance readiness scores to determine how taxed or exhausted certain teams, roles, levels, and/or departments are within the facility (e.g., one department is poorly staffed and therefore has a high health score because the workers are thinly spread out and exhausted; another department can be over staffed and can have a low health score because the workers are energized and don't have much work to do). Based on an extent to which any of these levels in the facility are strained, the manager can choose to shift proposed change to different times and/or different teams, roles, levels, and/or departments.

As another example, a manager at a facility can input information about proposed change into the application 206. The manager can also view information about his facility and/or a particular department, level, role, or team in the facility. This information can be based on the input that the manager provides to the application 206. In other words, when proposed change is inputted into the application 206, the views 1104, 1106, and 1108 can be dynamically updated to indicate how the proposed change would impact existing performance in the facility.

Although modifications to planning, scheduling, and implementing change are described as being made by a user, such as an employee or manager, such modifications can also be made or determined by one or more computer systems, as described herein (e.g., the change management system 110, the scheduling system 112).

As shown in FIG. 11B, the facility change impact roadmap interface 1110 can also include the impact score by month view 1106, the application 206, and the monthly impact by department view 1108. As shown, the impact score can be visualized based on department via a histogram or other similar graph, such as presenting changes in the impact score over time across various departments/groups. This can be advantageous for a manager or other leader in the facility to determine what departments are performing well and how departments are performing.

Figure 12:
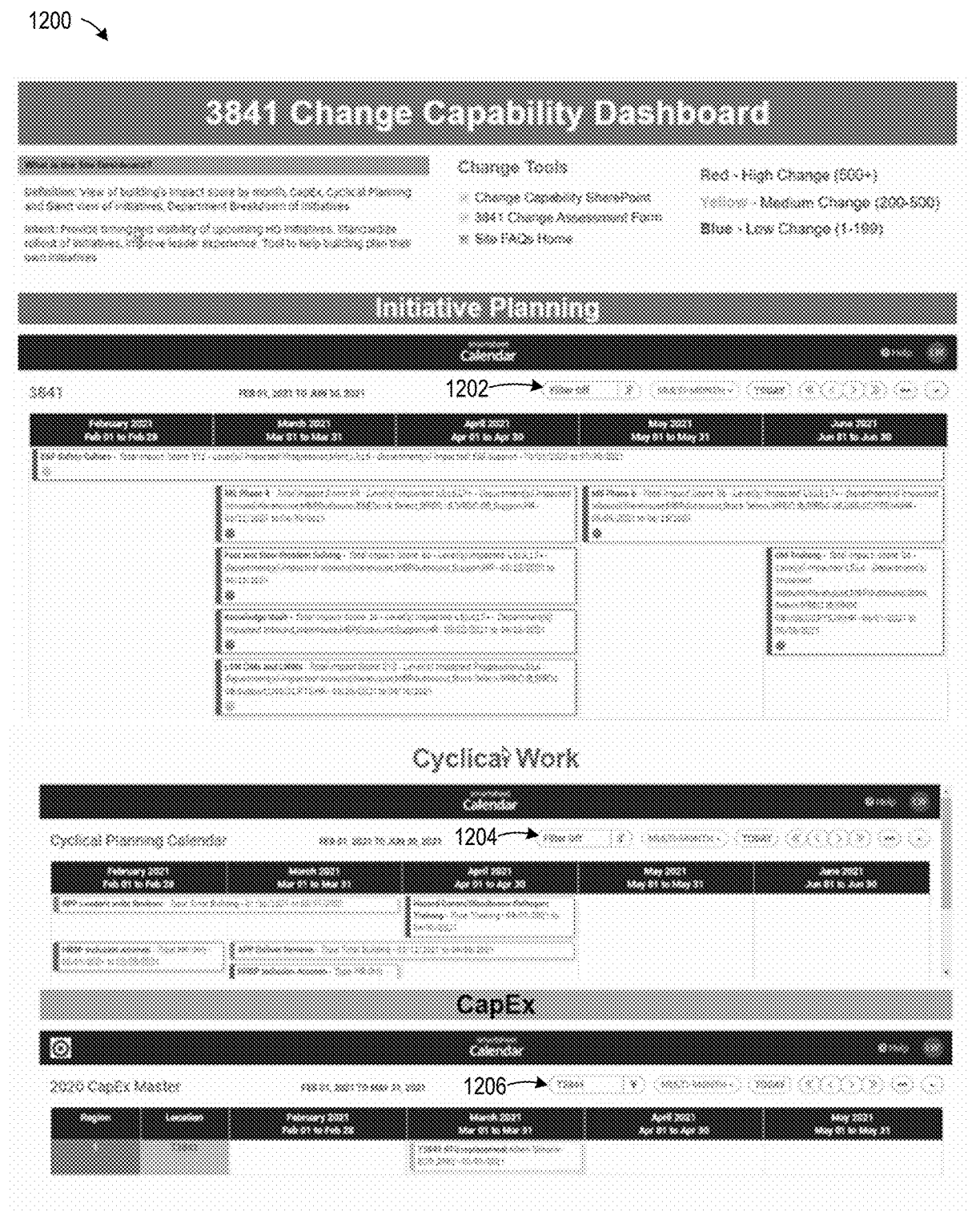

FIG. 12 is an example change impact roadmap 1200 for a facility in the enterprise. Views can be provided for a calendar or schedule of planned change as well as cyclical work and maintenance work (e.g., CapEx in the FIG. 12). A user can filter 1202 any of the views based on a variety of factors. For example, the user can filter the calendar to see scheduled changes based on level (e.g., leaders, managers, team members, etc.) as well as whether the change is classified as low impact, medium impact, or high impact.

The cyclical work view can provide a calendar of scheduled activities that occur every year or in cycles. These activities can be disruptive to a team but they are not permanent. Such activities may not change jobs or roles of team members, but can have an impact on scheduling change that the team members have to implement. Example activities can include annual reviews, network-wide training, and maintenance or technology updates. The cyclical work view can also be filtered 1204 based on a variety of factors, as mentioned above. The CapEx maintenance work view can also provide a calendar of scheduled maintenance. As mentioned, the calendar, cyclical work view, and CapEx view can be used to provide a more holistic view of what change is being implemented within the facility and/or how change can be scheduled or re-scheduled to better meet the needs of the facility. The CapEx view can also be filtered 1206 based on a variety of factors, as mentioned above.

Figure 13:
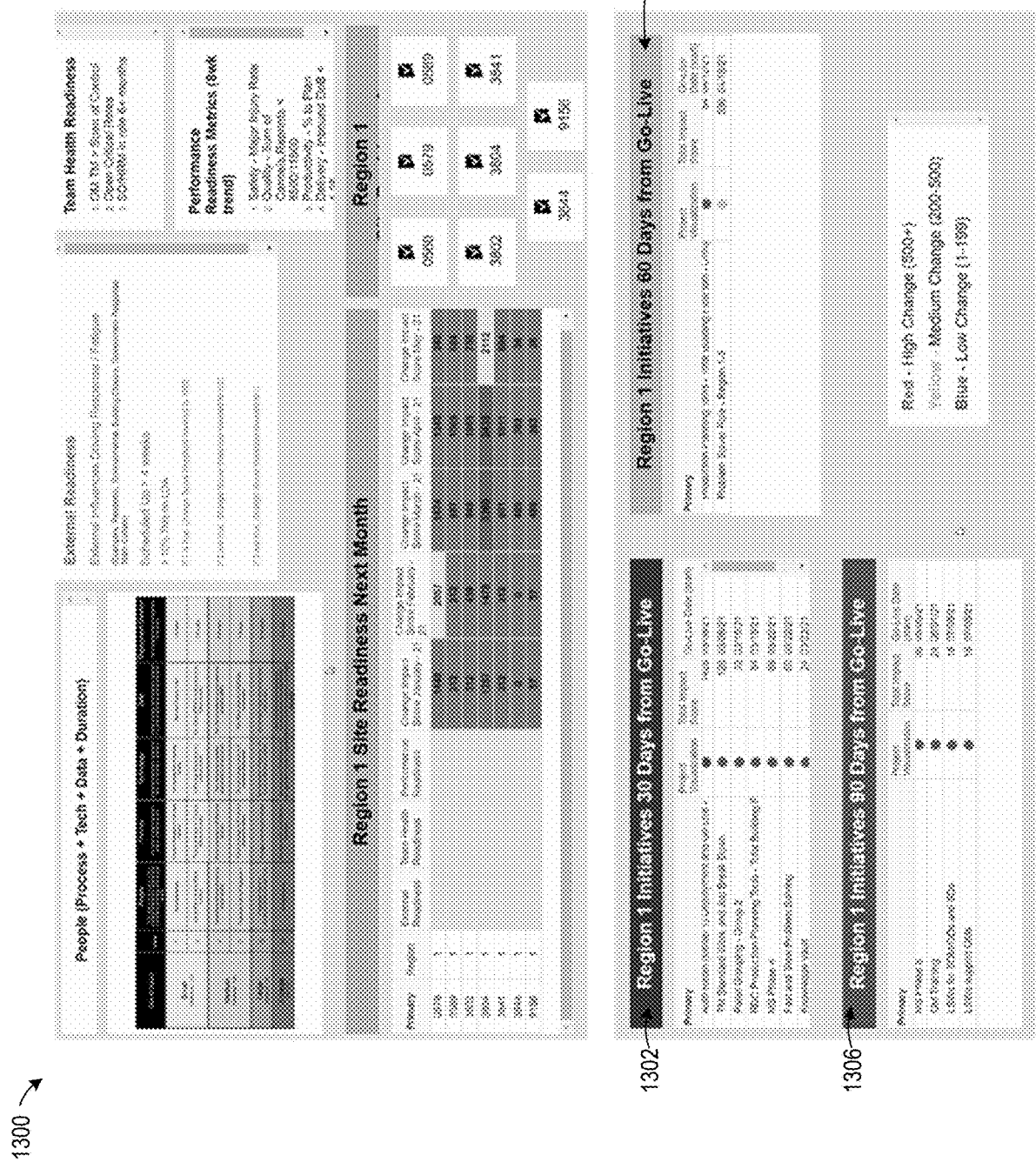
FIG. 13 is an example GUI display of change impact for a region in the enterprise.

FIG. 13 is an example GUI display 1300 of change impact for a region in the enterprise. A user can view change impact for any of the regions in the enterprise. As depicted, the GUI display 1300 can indicate external readiness, team health readiness, and performance readiness metrics for the region. The display 1300 can also indicate site readiness in the region for the following month, which can be beneficial to determine how to improve performance at any of the sites in the region to avoid having any of the sites in the red (e.g., poor performance). The display 1300 can further present an option to select and view information per site in the region.

The GUI display 1300 can also include 30-day reports, which can be beneficial to help users check in to make sure that the region is operating well. As shown in FIG. 13, the reports can include region initiatives 30 days from go-live 1302, initiatives 60 days from go-live 1304, and initiatives 90 days from go-live 1306. The reports can be provided for different time periods (e.g., every two months). Frequent reminders to check in can be beneficial to help the users identify whether the region is still able to deploy the initiatives on time, effectively, and/or properly.

Moreover, although not depicted, the GUI display 1300 can include the cyclical work and CapEx maintenance views described in reference to FIG. 12. Such views can indicate initiatives and activities based on building or facility in the region. The users can use these views to, for example, identify where problems in implementation may exist and what buildings may have issues with implementation in that region.

Figure 14:
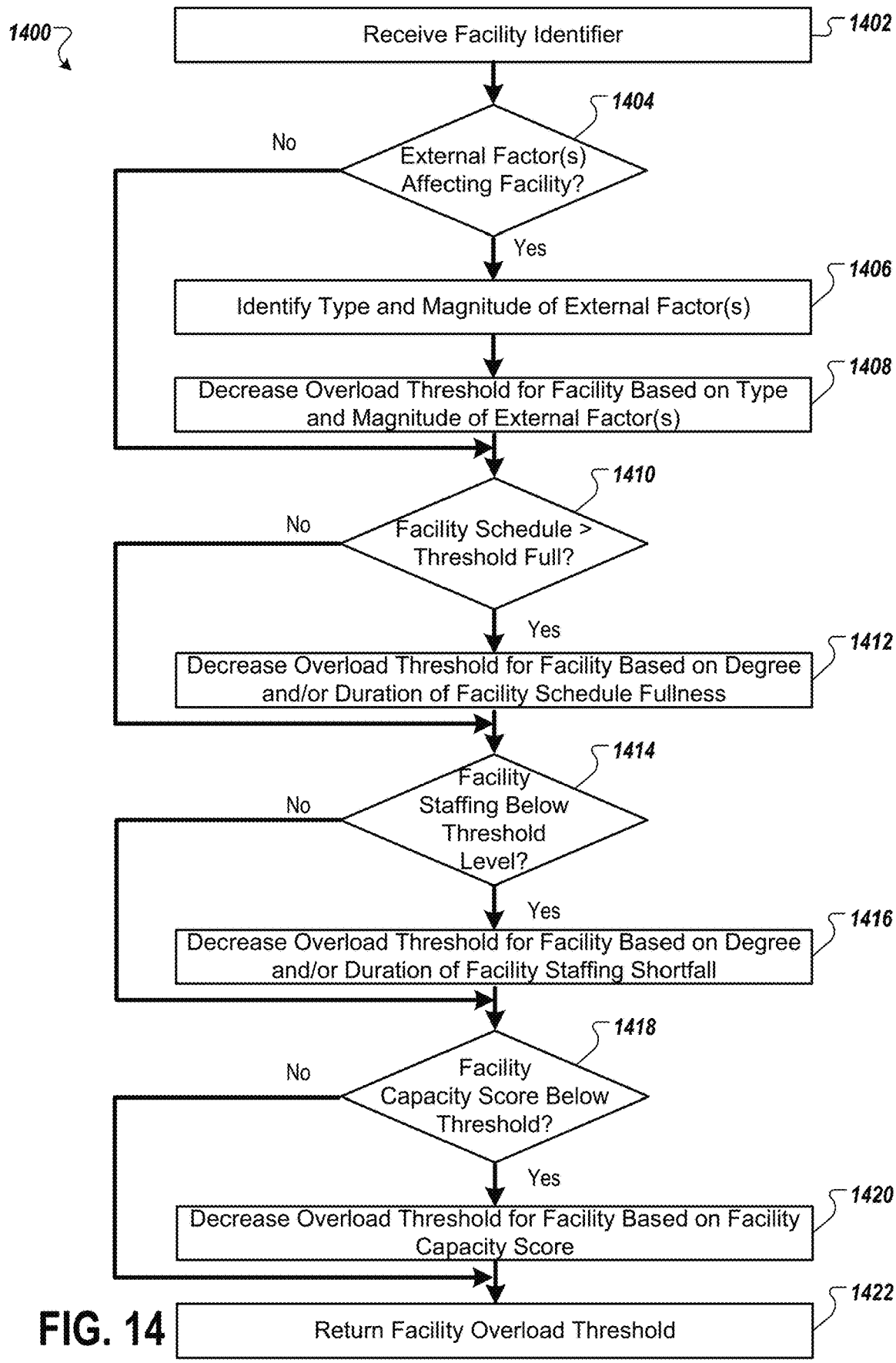
FIG. 14 is a flowchart of an example process for adjusting an overload threshold for a facility.

FIG. 14 is a flowchart of an example process 1400 for adjusting an overload threshold for a facility. The example process 1400 can be performed by one or more computer systems as described herein, and can also be performed as part of other processes described throughout this document. For example, the process 1400 can be performed by the change management system 110, as described above, and can be performed as part of process 500 (e.g., at step 504) and process 600 (e.g., at step 608).

A facility identifier can be received (1402) and a determination of whether the facility specified by the identifier is currently being affected by one or more external factors (1404). External factors can include, for example, environmental factors (e.g., natural disasters and severe weather, like hurricanes, earthquakes, floods, extreme heat or cold, tornados), health-related factors (e.g., pandemics, such as the covid-19 pandemic; hot spots for various transmissible diseases, such as measles, the flu), building closures (e.g., utility outages, such as electricity, water, and/or sewer outages), government responses and/or regulation (e.g., facility regulation and/or restrictions, such as limiting occupancy during covid-19 pandemic, masking requirements, vaccination requirements), team culture and effectiveness (e.g., fatigue or exhaustion for team members, ability to handle change initiatives/tasks), and/or other external factors. External factors may tracked and/or determined by the change management system 110 and/or through polling information on facilities from one or more other systems, such as the scheduling system 112 and/or other systems. Such external factors may impact the capacity of a facility to perform and meet various scheduling tasks. For example, extreme weather hitting a facility may cause physical damage to the facility and/or staffing shortages, which can decrease the ability for accommodating tasks at the facility. As a result, the overload threshold for the facility may be decreased.

If there are determined to be external factors affecting the facility (1404), then the type and magnitude of the external factors can be determined (1406). For example, the change management system 110 can have an enumerated set of external factors and can an enumerated value that corresponds to the type of external factor, such as a natural disaster, health-related issue, and/or other issue. Some external factors, such as natural disasters, may be capable of being remedied by redirecting resources to the facility, such as directing contractors and/or workers from other locations to a facility that has been damaged. Other external factors, such as high-rates of infection during a pandemic at a facility, may not be capable of being safely and readily remedied by redirecting resources, though (e.g., unable to safely redirect employees to fill-in for sick workers when community is experiencing high rates of spread). The type of the external factor can be used to determine potential resolutions and projected durations for the decreased capacity for the facility. The change management system 110 can additionally determine a magnitude of the external factor. For example, a natural disaster that damages only a portion of a facility may have a smaller magnitude than a natural disaster that damages the entire facility. Similarly, a facility that is experiencing a significant number of employees being out due to illness can be an external factor with a greater magnitude than a facility experiencing a smaller number of employees being out.

The change management system 110 can decrease the overload threshold for the facility based on the type and magnitude of the external factors (1408). The amount of the decrease can be a dynamic adjustment based on one or more formulas that correlate decreases in the threshold to the type and magnitude of the external factors, such as through a formula for each type. Alternatively, one or more static values may be applied to decrease the overload threshold based on different classifications of the type and magnitude of the external factor. An example of static values being selected and applied for external factors are described below with regard to FIG. 15. The decrease can be temporary and extend through the projected duration of the external factor.

The change management system 110 can additionally determine whether the facility schedule is greater than a threshold degree of being full for a duration of time (1410). For example, a change schedule that is at or near capacity for an extended duration may cause fatigue and exhaustion for some or all of the workers at a facility, which may decrease their capacity and ability to handle subsequent changes. As a result, the overload threshold may be decreased in instances where a facility has been operating at or near capacity (e.g., within 5% of capacity, 10% of capacity, 15% of capacity, 25% of capacity) for an extended duration of time (e.g., one month, two months, three months, six months, one year). If the facility is determined to have bene operating at or above a threshold capacity (fullness), then the overload threshold for the facility can be decreased (1412). The amount of the decrease in the overload threshold can be dynamically determined based, for example, on a degree and/or duration of schedule fullness for the facility. For example, the closer to the capacity threshold (i.e., overload threshold) that the facility has been operating at (the degree of schedule fullness) can cause a greater degree in the decrease of the overload threshold—meaning that the harder the workers at the facility have been pushing themselves may warrant a greater decrease in the overload threshold going forward to avoid burnout, long-term fatigue, and subsequent poor performance. In another example, the greater the duration that the facility has been operating at or near capacity, the greater the decrease in the overload threshold can be. The overload threshold may also be determined reduced by a static amount, an example of which is described below with regard to FIG. 15.

The current facility staffing can additionally be evaluated against one or more threshold levels (1414), such as identifying workers who are out on a leave of absence. If staffing has fallen below one or more of those levels, the overload threshold can be decreased (1416). The amount of the decrease can be dynamically determined, for example, based on a degree of the staffing shortfall (i.e., number of people who are out on leave) and/or a duration of the staffing shortfall (i.e., length of the leave of absences). For example, a greater number of workers who are out and/or a longer their time away from the facility can cause the overload threshold for the facility to be decreased by a greater amount. The overload threshold may also be decreased by a static value, such as an example that is described below with regard to FIG. 15.

The capacity score for the facility and its workers can be evaluated and a determination can be made as to whether it is below a threshold level (1418). The capacity score can include, for example, a score that quantifies the historical and/or projected productivity and ability of the workers in the facility to handle various volumes of change initiatives and tasks, as well as the readiness of the workers to handle subsequent change initiatives and tasks. Examples of capacity scores and/or readiness metrics are described throughout this documents, such as above with regard to assessing readiness and performance scores in FIGS. 3 and 6. An example for determining readiness scores are also described below with regard to FIGS. 20-21, which can use readiness surveys that can incorporate some aspects of net promoter scores to determine whether and to what extent workers are presently, historically, and/or likely to be in the future adopters and advocates of change initiatives, resisters to change initiatives, and/or neutrals on change initiatives. The overload threshold for the facility can be decreased by a dynamic amount determined based on the capacity score for facility. For example, a facility that has been determined to have a lower capacity score to handle change initiatives can have its overload threshold decreased by a greater amount than another facility with a higher capacity score (which is still below the threshold evaluated in step 1418). The overload threshold for the facility may also be decreased by a static amount.

The facility's overload threshold, as reduced according to steps 1404-1420, can be returned (1422) and used to perform the change management operations described throughout this document.

Figure 15:
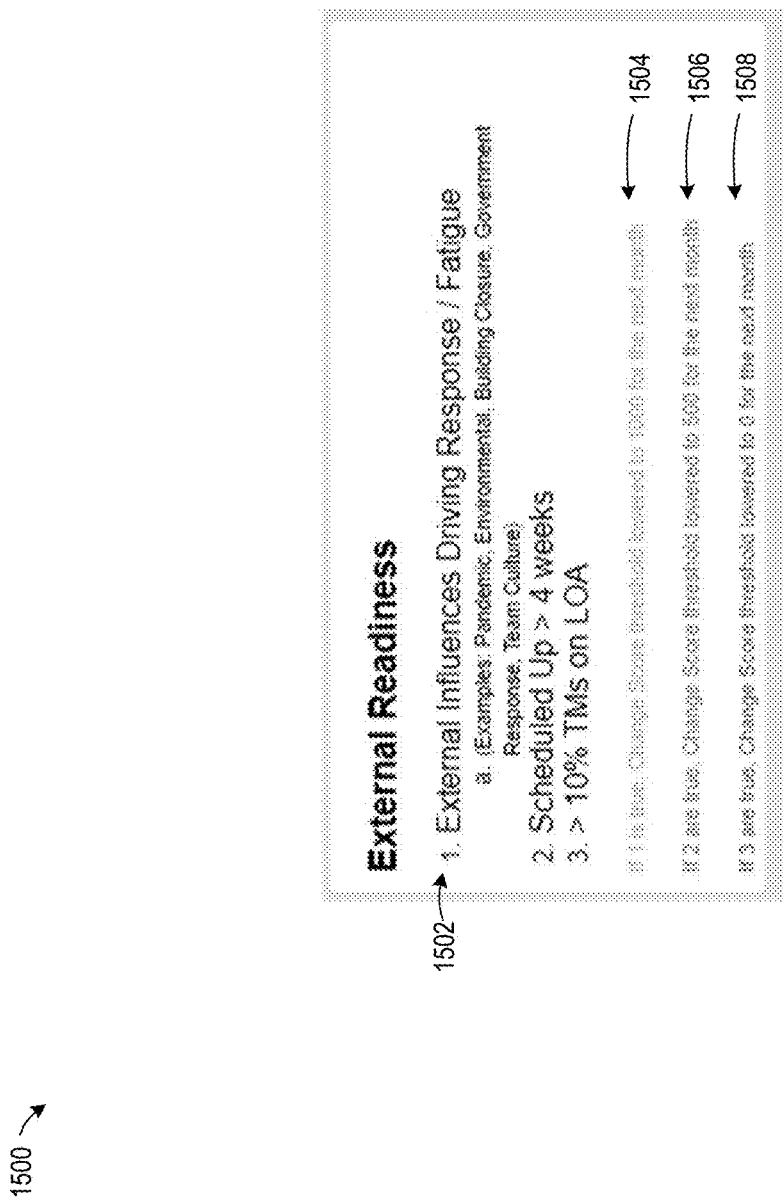
FIG. 15 is a screenshot of an example overload threshold adjustment for a facility.

FIG. 15 is a screenshot of an example overload threshold adjustment 1500 for a facility. The example 1500 depicts external readiness factors 1502, such as external influences driving response and/or fatigue, such as a pandemic, environmental factors, building closures, government responses, and team culture; the facility being scheduled up to at least a threshold level for greater than a duration of time (i.e., 4 weeks), and greater than a threshold of team members (i.e., 10% of team members or workers) being on a leave of absence (LOA), which may be due to medical reasons. Example static amounts 1504, 1506, and 1508 (e.g., collectively 1504-1508) by which the overload threshold for a facility can be decreased based on each of these external factors are depicted. Other static value decrease amounts are also possible. As described above with regard to FIG. 14, these amounts by which the overload threshold is decreased may additionally and/or alternatively be dynamically determined.

Figure 16:
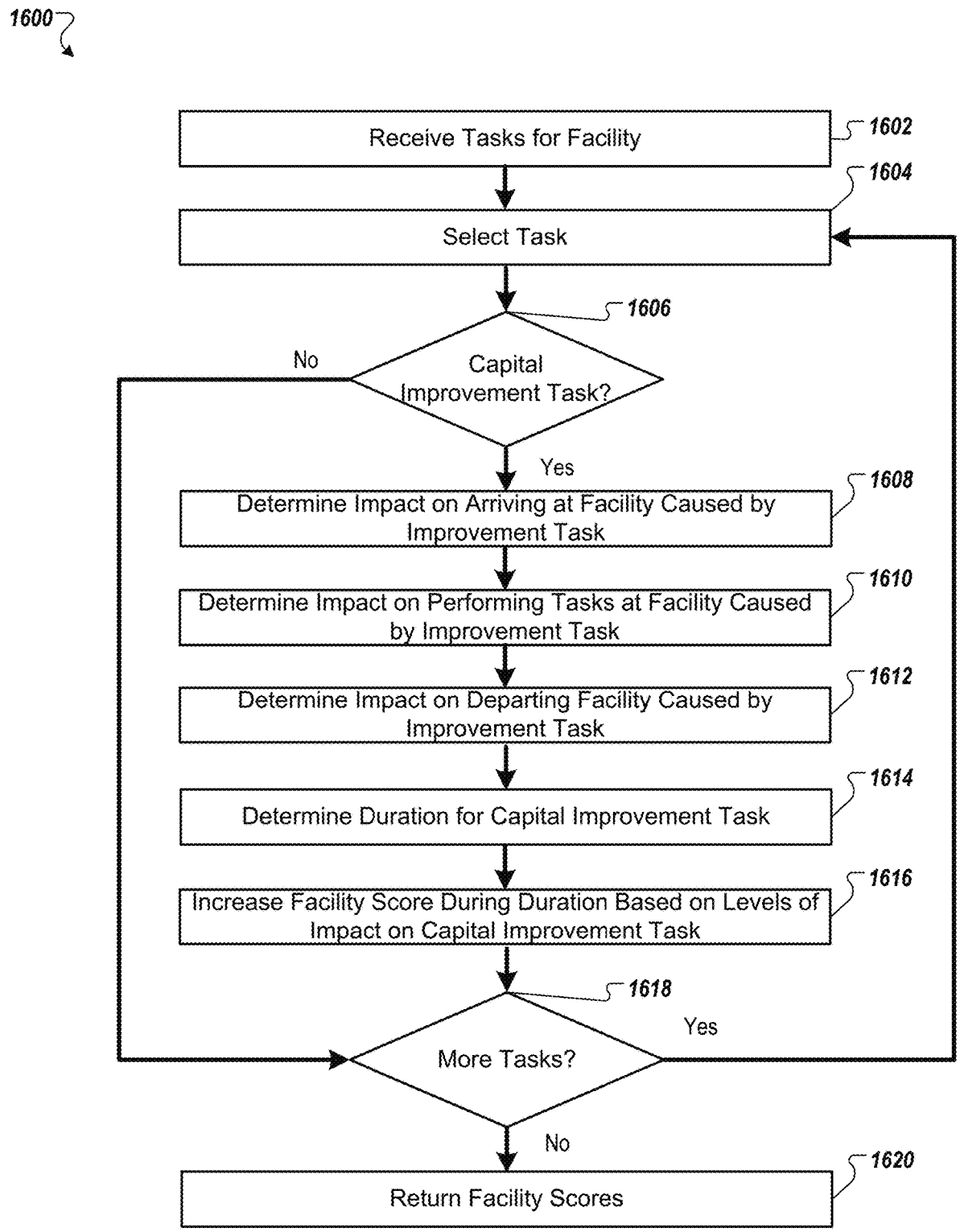
FIG. 16 is a flowchart of an example process for adjusting facility scores based on capital improvement tasks for a facility.

FIG. 16 is a flowchart of an example process 1600 for adjusting facility scores based on capital improvement tasks for a facility. The example process 1600 can be performed by one or more computer systems as described herein, and can also be performed as part of other processes described throughout this document. For example, the process 1600 can be performed by the change management system 110, as described above, and can be performed as part of process 300 (e.g., at step 304) and process 400 (e.g., at step 402).

The example process 1600 can be used to account for the impact of capital improvements, which are a type of change task, on the ability of a facility to handle other change tasks as well. For example, capital improvements may disrupt work flows, work spaces, and/or other normal operations. The process 1600 can quantify an impact of capital improvements on a facility's ability to accommodate change tasks and initiatives.

Change tasks (initiatives) for a facility can be received (1602). Change tasks can include, for example, changes to processes, equipment, and/or systems in a facility, as well as other initiatives, including HR initiatives and/or capital improvements (CapEx improvements). A task can be selected (1604) and a determination can be made as to whether the task is a capital improvement (1606). If the task is a capital improvement (1606), then a level impact on workers arriving at the facility caused by the capital improvement can be determined (1608), the level of impact on workers performing tasks at the facility caused by the capital improvement can be determined (1610), the level of impact on workers departing the facility caused by the capital improvement can be determined (1612), and the duration for the capital improvement task can be determined (1614). For example, a capital improvement may cause portions of a facility to be closed and/or inaccessible by workers at the facility, which may impact their arrival at the facility (e.g., take more time to arrive at facility due to capital improvement task, such as repaving parking lot), performing work at the facility (e.g., pathway within facility between two locations may be closed during remodeling, which may require worker to traverse longer distance to perform tasks), and/or leaving the facility (e.g., system to clock out of facility may impacted and cause workers to use alternate clock out process that takes longer). The duration of the capital improvement can quantify an amount of time that the capital improvement will take to be completed. The facility score, which can correspond to the change impact score (e.g., change impact score 812) and/or its component parts (e.g., people score 802, process score 804, technology score 806, data score 808, duration score 810), can be increased during the duration of the capital improvement based on the level impact for the capital improvement (1616). For example, if the capital improvement is projected to take two months and to result in 10% increase in the projected time for workers to arrive at, perform tasks, and/or leave the facility, then the score for the facility, such as the people score and/or the process score, for those two months can be increased. The amount by which the score for the facility is increased can be dynamically determined (i.e., based on an amount and/or criticality of the portion of facility with downtime), and/or predetermined as a static value (i.e., increase score for facility by static amount).

If there are more tasks for the facility (1618), then the steps 1604-1616 can be repeated for each task, with each capital improvement that is being undertaken for a facility further increasing the score for the facility. Once all tasks have been evaluated (1618), the scores for the facility can be returned and used to perform the change management operations described throughout this document (1620).

Figure 17:
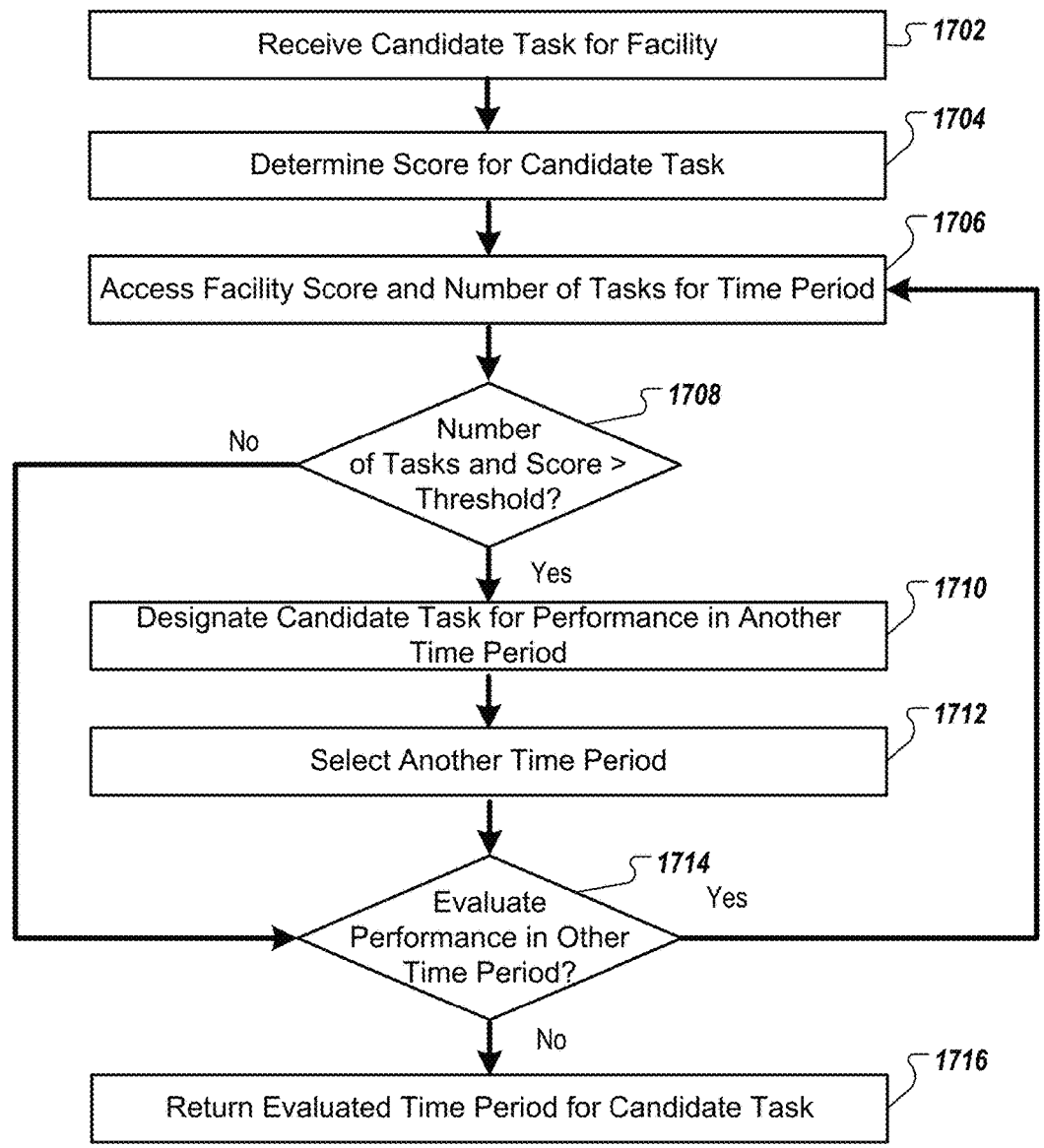
FIG. 17 is a flowchart of an example process for scheduling a candidate task for a facility based on a quantity of tasks being performed at the facility over a period of time.

FIG. 17 is a flowchart of an example process 1700 for scheduling a candidate task for a facility based on a quantity of tasks being performed at the facility over a period of time. The example process 1700 can be performed by one or more computer systems as described herein, and can also be performed as part of other processes described throughout this document. For example, the process 1700 can be performed by the change management system 110, as described above, and can be performed as part of process 300 (e.g., at step 304) and process 400 (e.g., at steps 404).

The example process 1700 can take into account a large volume or quantity of change initiatives and tasks over a period of time. For example, even though a facility is tasked with performing many small change initiatives may appear, based on the quantification of the change tasks as described above, to be within the capacity of a facility to manage, a large number of change initiatives and tasks over a time period (i.e., month, quarter, year) may be more challenging for a facility to accomplish in aggregate than based on their individual tasks. For instance, there may be worker time that is not accounted for to transition between tasks, to learn about new tasks and their objectives, and to manage performance of many different tasks. Accordingly, the process 1700 can take into consideration the aggregate effect of a large quantity or volume of change tasks on a facility to ensure that, although each individual change tasks may be reasonable for a facility to manage, the aggregate effort to manage a larger quantity of tasks is also taken into account as part of the change management processes and systems. The process 1700 can be used to determine whether scheduling of a new candidate task is possible within a given time period in light of the number of tasks scheduled within the time period.

A candidate tasks for a facility can be received (1702) and a score for the candidate task can be determined (1704), for example, using the processes described above. The candidate task can include a specified time period selected by the user submitting the candidate task, and/or an initial time period for the facility capable of accommodating the score for the candidate task (e.g., the score for the candidate task added to the impact score for the facility in time period does not exceed a threshold value) can be selected. The impact score for the facility and the number of tasks being performed within the selected time period can be accessed (1706). If the number of tasks and the score exceed one or more threshold values (1708), then the candidate task can be designated for performance in another period (1710). The threshold values can include a single combined threshold and/or multiple threshold values. For example, there can be a threshold for the number of tasks and a threshold for the facility score, and exceeding both values can cause the task to be designated for performance in another time period (1710). The threshold value for the number of tasks and the threshold value for the facility score may be dynamic and/or static. For instance, the threshold value for the number of tasks may decrease based on the facility score increasing, and/or the threshold facility score may decrease as the number of tasks increases—meaning that as the facility is more busy/occupied during a time period, the number of different or discrete tasks that the facility may be able to accommodate may decrease. Static values that do not change based on the number of tasks and/or the facility score during the time period are also possible.

Another time period can be selected for evaluation (1712) in response to number of tasks and score exceeding one or more thresholds (1708) and the steps 1706-1712 can be repeated for that time period (1714). If the number of tasks and/or score do not exceed the one or more thresholds (1708), then other time periods may not be examined (1714) and the evaluated time can be returned as an appropriate selection for scheduling the candidate task (1716)

Figure 18:
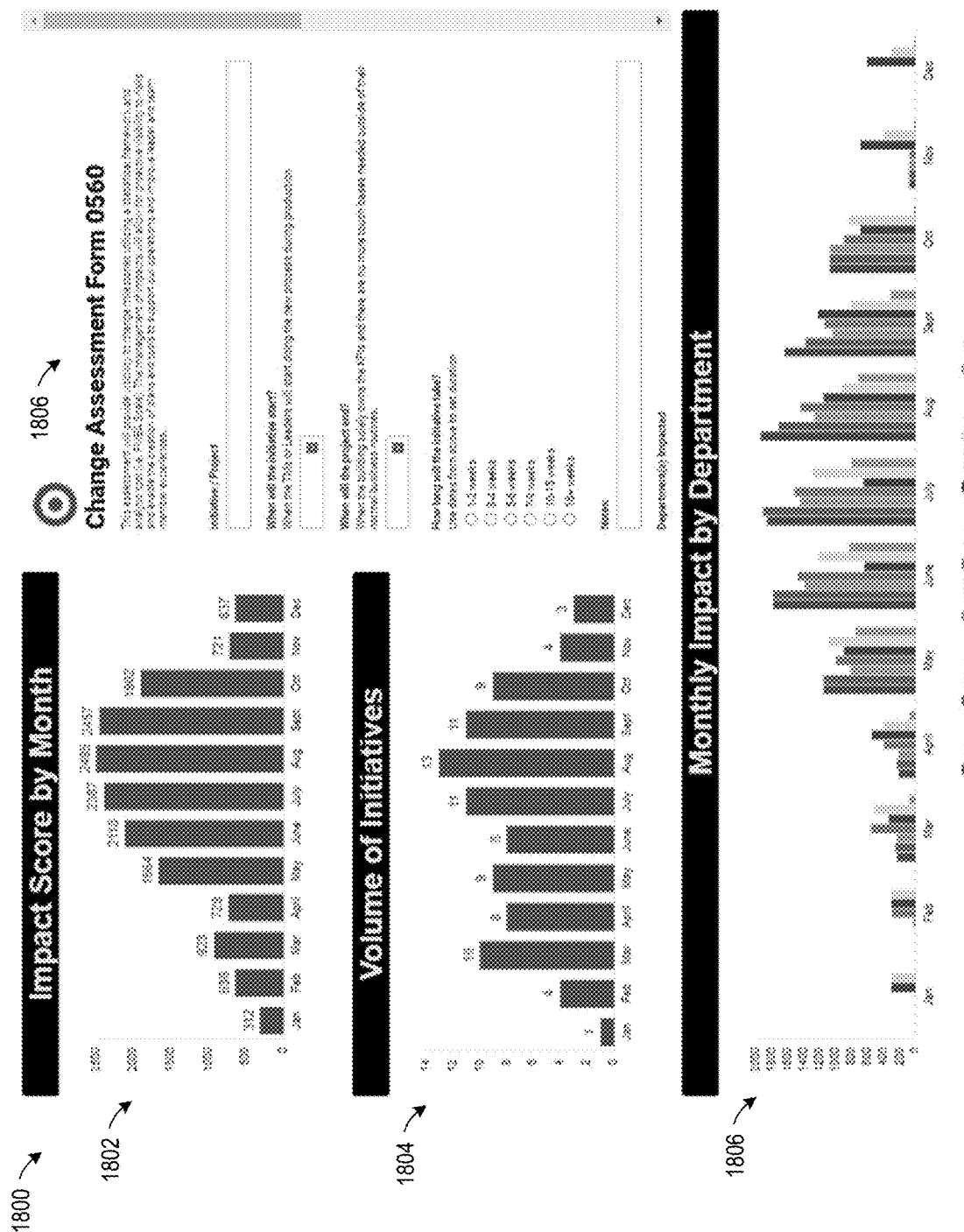
FIG. 18 is an example GUI display of change impact for a facility.

FIG. 18 is an example GUI 1800 display of change impact for a facility. The GUI 1800 can be provided by any of the systems and/or processes described throughout this document, and can be used in combination with any of the GUIs described throughout this document. The GUI 1800 can be similar to the GUIs described above with regard to FIGS. 11-13, and can present the change impact for an individual facility and/or a combination of facilities (e.g., facilities in region for an enterprise). The GUI 1800 includes multiple regions each presenting different information on change impacts, including an impact score by month 1802, a volume of initiatives by month 1804, an impact by department for each month (1806), and a change assessment form 1806 through which a user can enter a new change initiative to view the impact of the new change initiative and to schedule the change impact into an appropriate time window.

Figure 19:
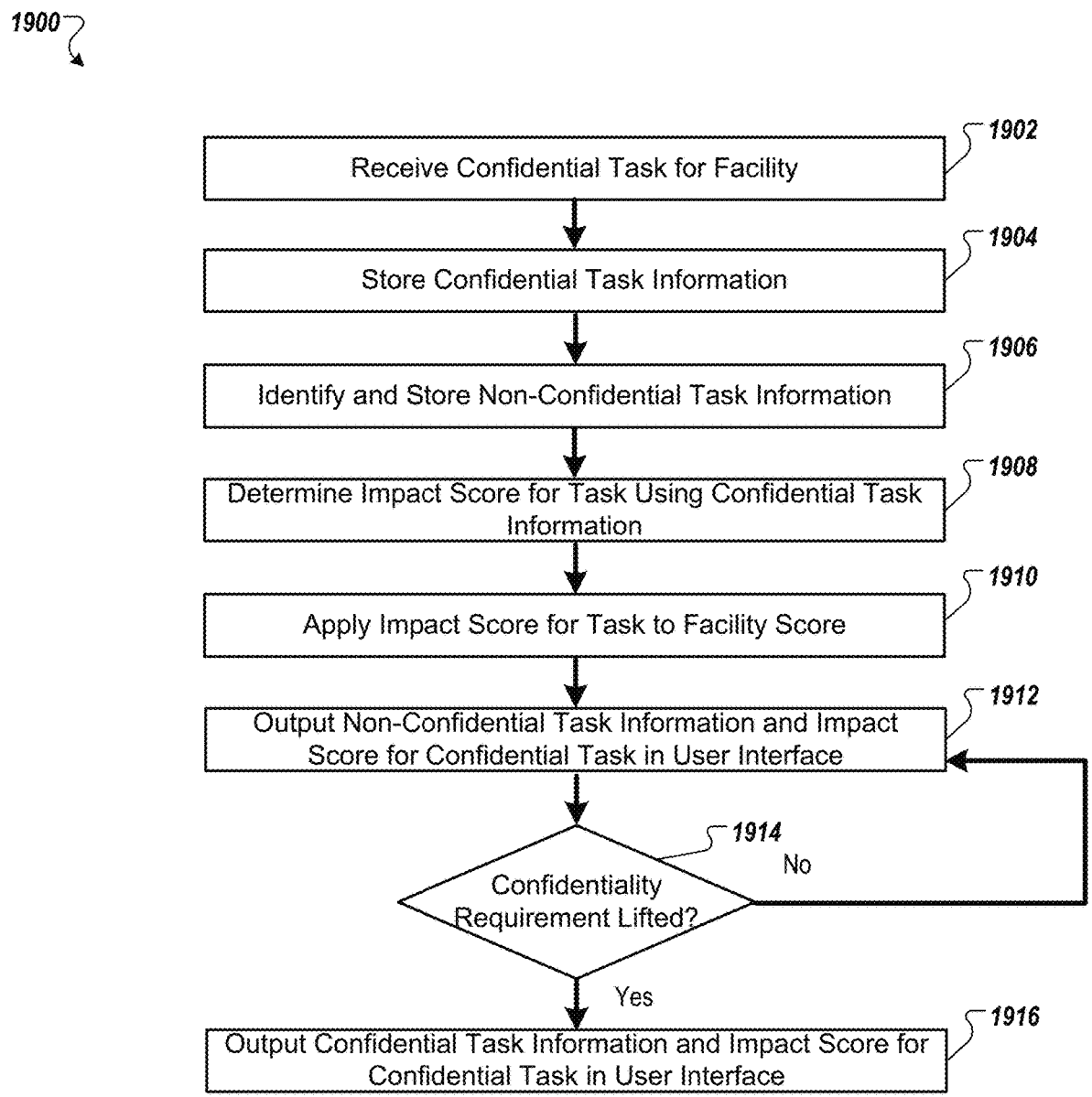
FIG. 19 is a flowchart of an example process for applying impact scores for confidential tasks for a facility.

FIG. 19 is a flowchart of an example process 1900 for applying impact scores for confidential tasks for a facility. The example process 1900 can be performed by one or more computer systems as described herein, and can also be performed as part of other processes described throughout this document. For example, the process 1900 can be performed by the change management system 110, as described above, and can be performed as part of process 300 (e.g., at steps 302 and 304), process 400 (e.g., at steps 404-412), and process 500 (e.g., step 512).

Some change initiatives and tasks may be confidential and only revealed to a facility once news of the change initiative or task has been made public. For example, an enterprise rolling out new checkout technology in a retail store (e.g., example facility) may need to be part of a public relations campaign that is messaged in a particular way and advanced notice to stores of the change, before the public relations campaign has been initiated, may partial and/or misinformation to initially reach the public, which may hurt the adoption, use, and excitement for the new technology by the public. However, being unable to list sensitive or confidential change initiatives and tasks for facilities until they have been made public can handcuff the use of the change management systems and their effectiveness in accurately assessing a facility's ability and capacity to handle changes over extended periods of time into the future. The technique 1900 can be used to permit for confidential change initiatives to still be incorporated into and used as part of the change management process and systems, while still maintaining their confidentiality.

A confidential task for a facility can be received (1902) and the confidential information for the task can be stored (1904). Non-confidential information for the tasks can be identified and stored separately from the confidential information (1906). For example, generic details about the confidential task, such as the department and duration of the task, can be identified as non-confidential information that can be stored. The confidential information can be used internally by system to determine impact scores (1908) and to apply impact scores for a facility (1910), but then only the non-confidential information determined in step 1906 can be output in combination with the impact scores for the confidential task in the user interface (1912). The confidential information and the non-confidential information can be linked internally within the system for the task, along with a flag indicating the status of the confidentiality of the task (i.e., Boolean value). That flag can be used to determine whether the confidentiality requirement has been lifted for the task (1914). If the flag has not yet been lifted, then the information that is output can continue to be the non-confidential information (1912). Once the confidentiality requirement has been lifted, then the confidential task information can be output in the user interface (1916). For example, a task creator can designate a task as confidential initially and then, once the confidentiality period for the task has passed (i.e., public relations around change initiative has started), the task creator can remove the confidential designation from the task. The confidential designation may be manually controlled (i.e., designating radio button in user interface) and/or automated, such as through an expiration date for the confidentiality.

Figure 20:
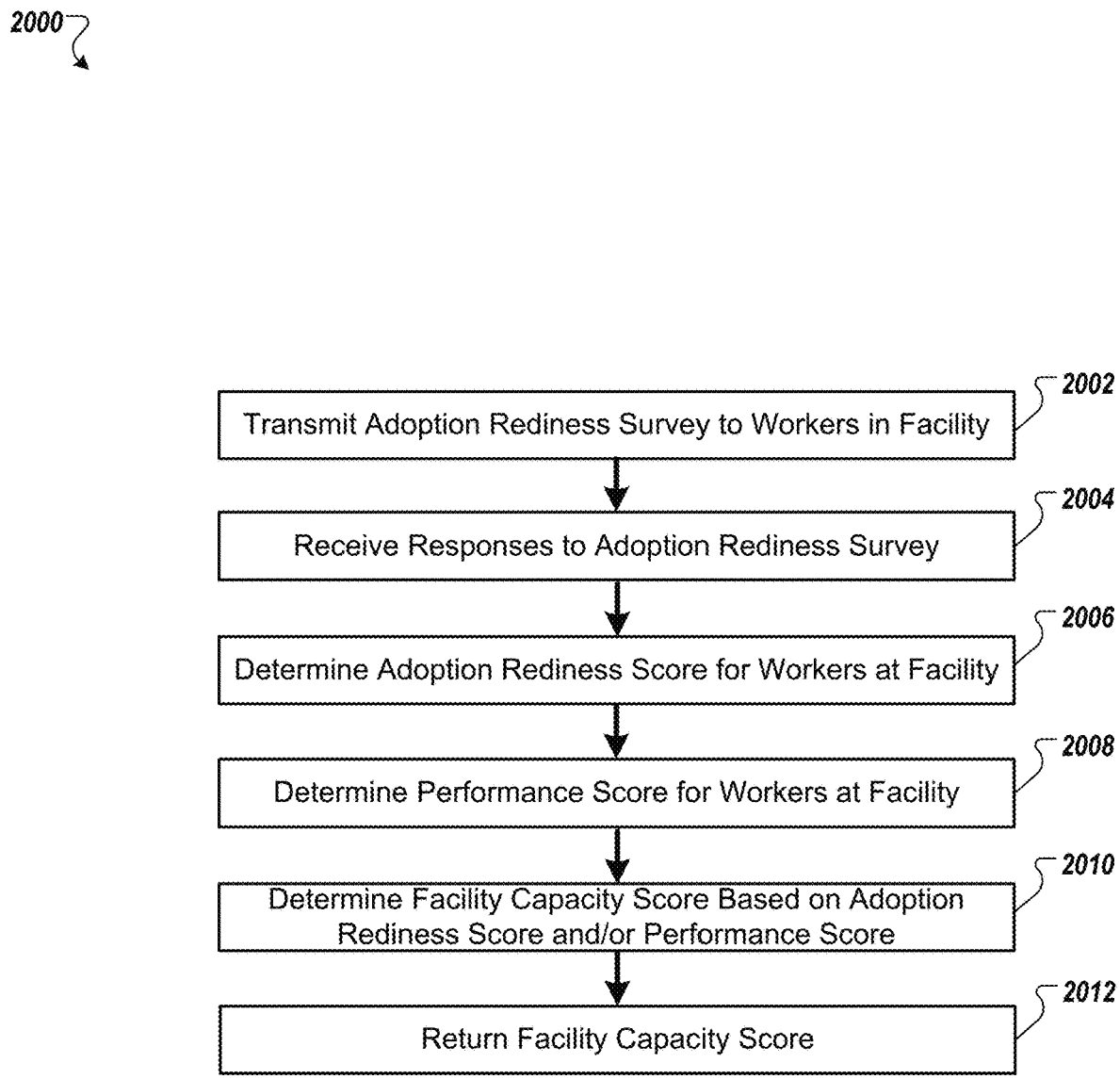
FIG. 20 is a flowchart of an example process for determining a facility capacity score for a facility.

FIG. 20 is a flowchart of an example process 2000 for determining a facility capacity score for a facility. The example process 2000 can be performed by one or more computer systems as described herein, and can also be performed as part of other processes described throughout this document. For example, the process 2000 can be performed by the change management system 110, as described above, and can be performed as part of process 500 (e.g., at step 504), process 600 (e.g., at step 608), and process 1400 (e.g., at steps 1418 and 1420).

Figure 21:
FIG. 21 is an example GUI for an adoption readiness survey.

An adoption readiness survey can be transmitted to one or more workers at a facility (2002). For example, the example GUI 2100 for an adoption readiness survey, as depicted in FIG. 21, can be transmitted a client computing device associated with one or more workers at a facility. The one or more workers can include, for example, workers in managerial roles who will be overseeing and managing the implementation of change tasks. The one or more workers can additionally include workers who will be performing the change tasks or taking part in the tasks, such as training exercises. Responses from the client computing devices associated with the workers can be received (2004). The responses can include, for example, a numerical assessment of how confident the worker is that they will be able to accomplish the scheduled change initiatives and tasks for the upcoming time period (e.g., next week, next month, next two months). The responses from the worker client devices can be used to determine an adoption readiness score for the workers (2006). The adoption readiness score can be, for example, a net promoter score that can aggregate sentiments from a population of workers at a facility as to whether they are positive, negative, or neutral about being able to accomplish the question posed in the survey (e.g., as presented in FIG. 21). Performance scores for the workers at the facility can be determined (2008). The performance scores can be similar to the performance score described above, such as with regard to step 606, and can determine an ability of workers at the facility to perform change initiatives and tasks based on their historical performance. A facility capacity score can be determined based on the adoption readiness score and/or the performance score, such as based on a combination of the adoption readiness score and the performance score (2010). The adoption readiness score may be a value that is in a range from negative to positive, with a max negative value indicating very negative sentiment from workers of being able accomplish upcoming tasks, a max positive value indicating very positive sentiments from workers, and values there between indicating sentiments between those extremes. The adoption readiness score can be combined with to the performance score, such as being added, multiplied, subtracted from, divided by, and/or other combinations. The facility capacity score can indicate a capacity of the workers in a facility to perform change initiatives and tasks, for example, based on historical performance in the facility and also based on current sentiments for the workers in the facility. The facility capacity score can be returned (2012).

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for managing and scheduling changes across an organization, the method comprising:

receiving, at a change management computer system, a request to implement a proposed change for a facility within an organization, wherein the request includes parameters for the proposed change;

determining, by the change management computer system, a change score for the proposed change that quantifies a magnitude of impact for the proposed change on the facility within the organization, wherein the determining is performed based on applying a computer-executed model to the parameters for the proposed change, wherein determining the change score comprises:
  calculating a technology metric based on the parameters for the proposed change and the model, wherein the technology metric quantifies a technology impact on the facility for the proposed change, wherein the model is used to evaluate and quantify the technology impact comprising one or more technology fixes and new technology to be deployed to determine the technology metric;
  calculating a data metric based on the parameters for the proposed change and the model, wherein the data metric quantifies a data impact on the facility for the proposed change, wherein the model is used to evaluate and quantify the data impact comprising one or more data reporting and data visualization changes to be deployed to determine the data metric; and
  combining the technology metric and the data metric to determine the change score;
determining, by the change management computer system and using the computer-executed model, a readiness metric for the facility, wherein the readiness metric quantifies a current ability of the facility to implement the proposed change based on current environmental conditions, recorded performance data for the facility indicating past performance by the facility with regard to previous changes, and a current workforce assessment for the facility;
accessing, from a change management database system, data records identifying other changes that are currently scheduled to be performed by the facility over a plurality of time periods, wherein the data records include other change scores for the other changes that quantify magnitudes of impact for the other changes on the facility;
determining, by the change management computer system and using the computer-executed model, a plurality of scheduled change scores for the facility within the organization for the plurality of time periods based, at least in part, on the other changes scores for the other changes scheduled for the facility over the plurality of time periods, wherein the plurality of schedule scheduled change scores indicate, for each of the plurality of time periods, an aggregate magnitude of impact on the facility for the other changes that are already scheduled for the facility;
selecting, by the change management computer system, one or more time periods from the plurality of time periods as being suitable for scheduling the proposed change for the facility based on (i) the readiness metric for the facility, (ii) identifying a scheduled change score amongst the plurality of scheduled change scores that is less than a first threshold value and (iii) determining that combining the identified schedule change score with the change score for the proposed change would not cause the identified scheduled change score to exceed a second threshold value;
generating, by the change management computer system, a decision guidance framework including instructions to implement the proposed change during the one or more time periods;
outputting, by the change management computer system, the decision guidance framework; and
iteratively training, by the change management computer system, the computer-executed model to dynamically adjust the change score for the proposed change and the readiness metric for the facility, wherein the iterative training is based at least in part on (i) the data records identifying the other changes that are currently scheduled and (ii) user input received by the change management system in response to outputting the decision guidance framework, wherein the user input comprises information about an actual implementation of the proposed change for the facility.

2. The method of claim 1, wherein determining the change score for the proposed changes further comprises:
  calculating, by the change management computer system, a people metric based on the parameters, wherein the people metric quantifies a personnel impact on the facility for the proposed change;
  calculating, by the change management computer system, a process metric based on the parameters, wherein the process metric quantifies a process impact on the facility for the proposed change;
  calculating, by the change management computer system, a duration metric based on the parameters, wherein the duration metrics quantifies a deployment duration impact on the facility for the proposed change; and
  combining, by the change management computer system, the people metric, the process metric, the technology metric, the data metric, and the duration metric to determine the change score.

3. The method of claim 2, wherein combining the people metric, the process metric, the technology metric, the data metric, and the duration metric comprises:
  automatically generating, by the change management computer system, a sum of the process metric, the technology metric, the data metric, and the duration metric; and
  generating, by the change management computer system, a product of the sum multiplied by the people metric.

4. The method of claim 2, wherein at least one of the people metric, the process metric, the technology metric, the data metric, or the duration metric is selected from a set of enumerated values based on the parameters for the proposed change.

5. The method of claim 2, further comprising:
  determining, by the change management computer system, a people metric weight based on (i) roles of people in the facility impacted by the proposed change and (ii) historical performance of the people in the facility with regard to previous changes; and
  weighting the people metric using the people metric weight.

6. The method of claim 2, further comprising:
  determining, by the change management computer system, a process metric weight based on a number of precursor actions required by the facility to implement the proposed change; and
  weighting the process metric using the process metric weight.

7. The method of claim 1, further comprising:
  determining, by the change management computer system, a technology metric weight based on (i) a number of technology changes required for the proposed change and (ii) a magnitude of the technology changes; and weighting the technology metric using the technology metric weight.

8. The method of claim 1, further comprising:

determining, by the change management computer system, a data metric weight based on (i) changes to types of information presented to users and (ii) changes to interfaces presented to the users by the proposed change; and weighting the data metric using the data metric weight.

9. The method of claim 2, further comprising:

determining, by the change management computer system, a duration metric weight based on a length of time required to implement the proposed change; and weighting the duration metric using the duration metric weight.

10. The method of claim 1, wherein selecting, by the change management computer system, the one or more time periods further comprises:

determining aggregate change scores for the plurality of time periods, wherein each of the aggregate change scores is determined based on a combination of a portion of the plurality of scheduled change scores that fall within the corresponding time period amongst the plurality of time periods; and identifying the one or more time periods based on a comparison of the aggregate change scores for the plurality of time periods.

11. The method of claim 10, wherein the comparison of the aggregate change scores comprises comparing the aggregate change scores against a plurality of score ranges indicating a capacity of the facility to accept further changes within a time period.

12. The method of claim 11, wherein the plurality of score ranges include:

a first score range that indicates that the facility does not have capacity to accept further changes within the time period, a second score range that indicates that the facility is nearing capacity to accept further changes within the time period, and a third score range that indicate that the facility has at least a threshold amount of capacity to accept further changes within the time period.

13. The method of claim 11, wherein the score ranges are dynamically determined, by the change management computer system, for the facility based on applying the computer-executed model to data indicating historical performance of the facility with regard to changes.

14. The method of claim 12, wherein the one or more time periods are selected based on their corresponding aggregate change scores being within the third score range.

15. The method of claim 14, wherein outputting, by the change management computer system, the decision guidance framework comprises outputting the one or more time periods with designations for being within the third score range.

16. The method of claim 15, wherein the outputting, by the change management computer system, the decision guidance framework further comprises outputting the other time periods from the plurality of time periods with their corresponding designations for the first score range and the second score range.

17. A system for managing and scheduling changes across an organization, the system comprising:

a change management computer system that schedules change across the organization, the change management computer system configured to:

receive a request to implement a proposed change for a facility within an organization, wherein the request includes parameters for the proposed change;

determine a change score for the proposed change that quantifies a magnitude of impact for the proposed change on the facility within the organization, wherein the determining is performed based on applying a computer-executed model to the parameters for the proposed change, wherein determining the change score comprises:

calculating a technology metric based on the parameters for the proposed change and the model, wherein the technology metric quantifies a technology impact on the facility for the proposed change, wherein the model is used to evaluate and quantify the technology impact comprising one or more technology fixes and new technology to be deployed to determine the technology metric;

calculating a data metric based on the parameters for the proposed change and the model, wherein the data metric quantifies a data impact on the facility for the proposed change, wherein the model is used to evaluate and quantify the data impact comprising one or more data reporting and data visualization changes to be deployed to determine the data metric; and combining the technology metric and the data metric to determine the change score;

determine, using the computer-executed model, a readiness metric for the facility, wherein the readiness metric quantifies a current ability of the facility to implement the proposed change based on current environmental conditions, recorded performance data for the facility indicating past performance by the facility with regard to previous changes, and a current workforce assessment for the facility;

access, from a change management database system, data records identifying other changes that are currently scheduled to be performed by the facility over a plurality of time periods, wherein the data records include other change scores for the other changes that quantify magnitudes of impact for the other changes on the facility;

determine, using the computer-executed model, a plurality of scheduled change scores for the facility within the organization for the plurality of time periods based, at least in part, on the other changes scores for the other changes scheduled for the facility over the plurality of time periods, wherein the plurality of scheduled change scores indicate, for each of the plurality of time periods, an aggregate magnitude of impact on the facility for the other changes that are already scheduled for the facility;

select one or more time periods from the plurality of time periods as being suitable for scheduling the proposed change for the facility based on (i) the readiness metric for the facility, (ii) identifying a scheduled change score amongst the plurality of scheduled change scores that is less than a first threshold value and (iii) determining that combining the identified schedule change score with the change score for the proposed change would not cause the identified scheduled change score to exceed a second threshold value;

generate a decision guidance framework including instructions to implement the proposed change during the one or more time periods;

output the decision guidance framework; and iteratively train the computer-executed model to dynamically adjust the change score for the proposed change and the readiness metric for the facility, wherein the iterative training is based at least in part on (i) the data records identifying the other changes that are currently scheduled and (ii) user input received by the change management system in response to outputting the decision guidance framework, wherein the user input comprises information about an actual implementation of the proposed change for the facility.

18. The system of claim 17, wherein determining the change score for the proposed changes further comprises:

calculating a people metric based on the parameters, wherein the people metric quantifies a personnel impact on the facility for the proposed change;

calculating a process metric based on the parameters, wherein the process metric quantifies a process impact on the facility for the proposed change;

calculating a duration metric based on the parameters, wherein the duration metrics quantifies a deployment duration impact on the facility for the proposed change; and combining the people metric, the process metric, the technology metric, the data metric, and the duration metric to determine the change score.

19. The system of claim 17, wherein selecting the one or more time periods further comprises:

determining aggregate change scores for the plurality of time periods, wherein each of the aggregate change scores is determined based on a combination of a portion of the plurality of scheduled change scores that fall within the corresponding time period amongst the plurality of time periods; and identifying the one or more time periods based on a comparison of the aggregate change scores for the plurality of time periods.

20. The system of claim 19, wherein the comparison of the aggregate change scores comprises comparing the aggregate change scores against a plurality of score ranges indicating a capacity of the facility to accept further changes within a time period.

* * * * *